United States Patent
Zheng et al.

(10) Patent No.: US 12,238,016 B2
(45) Date of Patent: Feb. 25, 2025

(54) SYSTEMS AND METHODS FOR INTERFERENCE MANAGEMENT

(71) Applicant: ZTE CORPORATION, Guangdong (CN)

(72) Inventors: Guozeng Zheng, Shenzhen (CN); Zhaohua Lu, Shenzhen (CN); Huahua Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 380 days.

(21) Appl. No.: 17/852,274

(22) Filed: Jun. 28, 2022

(65) Prior Publication Data

US 2022/0345259 A1 Oct. 27, 2022

Related U.S. Application Data

(63) Continuation of application No. PCT/CN2020/119637, filed on Sep. 30, 2020.

(51) Int. Cl.
| | |
|---|---|
| *H04L 5/00* | (2006.01) |
| *H04L 27/26* | (2006.01) |
| *H04W 72/23* | (2023.01) |
| *H04W 72/54* | (2023.01) |

(52) U.S. Cl.
CPC ........ *H04L 5/0005* (2013.01); *H04L 27/2657* (2013.01); *H04W 72/23* (2023.01); *H04W 72/54* (2023.01)

(58) Field of Classification Search
CPC ............... H04L 5/0048; H04L 5/0005; H04L 5/0094; H04L 5/0035; H04L 5/0055; H04L 5/0057; H04L 12/2869; H04L 12/5695; H04L 47/00; H04L 47/70; H04L 47/78; H04L 47/821; H04L 47/827; H04W 72/04; H04W 4/029; H04W 4/025
See application file for complete search history.

(56) References Cited

U.S. PATENT DOCUMENTS

| | | | |
|---|---|---|---|
| 8,483,165 B2 * | 7/2013 | Han | H04L 5/0048 370/329 |
| 9,344,953 B2 * | 5/2016 | Chmiel | H04W 48/08 |
| 9,480,062 B2 * | 10/2016 | Noh | H04L 25/0226 |
| 9,807,758 B2 * | 10/2017 | Noh | H04B 7/15507 |
| 10,778,396 B2 * | 9/2020 | Hwang | H04L 5/0051 |

(Continued)

FOREIGN PATENT DOCUMENTS

| | | |
|---|---|---|
| CN | 109845172 A | 6/2019 |
| WO | WO-2020/167052 A1 | 8/2020 |

OTHER PUBLICATIONS

Extended European Search Report on EP 20955774.3 dated Aug. 7, 2023 (10 pages).

(Continued)

*Primary Examiner* — Jung Liu
(74) *Attorney, Agent, or Firm* — Foley & Lardner LLP

(57) ABSTRACT

A system and method for interference management. The system and method include configuring, by a wireless communication node, a resource mapping pattern for a reference signal; and updating, by the wireless communication node based on a time-domain position of the reference signal, the resource mapping pattern by changing a sequence that represents a plurality of frequency-domain offsets of the reference signal relative to a frequency-domain position of the reference signal.

18 Claims, 21 Drawing Sheets

(56) References Cited

U.S. PATENT DOCUMENTS

| | | | | |
|---|---|---|---|---|
| 10,903,962 | B2* | 1/2021 | Hwang | H04L 67/12 |
| 11,082,179 | B2* | 8/2021 | Chen | H04L 5/0048 |
| 11,239,967 | B2* | 2/2022 | Manolakos | H04L 5/0048 |
| 11,290,229 | B2* | 3/2022 | Chuang | H04W 72/044 |
| 11,611,967 | B2* | 3/2023 | Wu | H04W 72/0446 |
| 11,637,605 | B2* | 4/2023 | Oh | H04B 7/0626 370/329 |
| 11,743,009 | B2* | 8/2023 | Chuang | H04W 72/044 370/330 |
| 11,764,925 | B2* | 9/2023 | Chen | H04L 5/0005 370/329 |
| 11,929,958 | B2* | 3/2024 | Ren | H04B 17/382 |
| 11,973,712 | B2* | 4/2024 | Jongren et al. | H04L 5/0032 |
| 12,014,441 | B2* | 6/2024 | Sharma | G06T 1/0064 |
| 12,021,609 | B2* | 6/2024 | Parkvall | H04L 5/1469 |
| 2010/0246376 | A1* | 9/2010 | Nam | H04L 5/0051 370/208 |
| 2012/0002740 | A1* | 1/2012 | Han | H04L 5/0048 455/517 |
| 2013/0039285 | A1* | 2/2013 | Sorrentino | H04W 72/51 370/329 |
| 2016/0330011 | A1 | 11/2016 | Lee et al. | |
| 2019/0327056 | A1* | 10/2019 | Chen | H04L 5/00 |
| 2020/0351045 | A1* | 11/2020 | Manolakos | H04L 5/0048 |
| 2020/0351883 | A1* | 11/2020 | Wu | H04W 72/0453 |
| 2021/0242917 | A1* | 8/2021 | Oh | H04B 7/0636 |
| 2021/0385048 | A1* | 12/2021 | Ren | H04L 5/0062 |
| 2022/0060299 | A1* | 2/2022 | Chen | H04L 5/0048 |
| 2022/0131630 | A1* | 4/2022 | Ghozlan | H04W 24/02 |
| 2022/0131659 | A1* | 4/2022 | Jongren et al. | H04W 72/20 |
| 2022/0224477 | A1* | 7/2022 | Chuang | H04W 72/23 |
| 2022/0337461 | A1* | 10/2022 | Liu | H04L 5/0094 |
| 2023/0246774 | A1* | 8/2023 | Gao | H04L 5/001 370/329 |

OTHER PUBLICATIONS

VIVO, "Discussion on potential positioning enhancements," 3GPP TSG RAN WG1 #101; R1-2003429; May 25-Jun. 5, 2020; e-Meeting (13 pages).

Ericsson: "PRS separation based on Cyclic shifts" 3GPP TSG-RAN WG1 Meeting #101-e; R1-2004653; Jun. 5, 2020; e-Meeting (6 pages).

Intel Corporation: "Feature Lead Summary #1 on AI 7.2.10.1—DL Reference Signals for NR Positioning" 3GPP TSG RAN WG1 Meeting #99; R1-1913285; Nov. 22, 2019; Reno, USA (26 pages).

International Search Report and Written Opinion for PCT Appl. No. PCT/CN2020/119637, mailed May 26, 2021 (9 pages).

OPPO: "Discussion on DL Reference Signals for NR Positioning" 3GPP TSG RAN WG1 #99; R1-1911847; Nov. 22, 2019; Reno, USA (8 pages).

OPPO: "Discussion on RE mapping in reference signal for NR positioning" 3GPP TSG RAN WG1 #100bis; R1-2001735; Apr. 20, 2020; e-Meeting (3 pages).

* cited by examiner

| Comb size Frequency offset Number of symbols | 1 symbol | 2 symbols | 4 symbols | 8 symbols | 12 symbols |
|---|---|---|---|---|---|
| Comb-2 | {0} | {0,1} | {0,1,0,1} | N/A | N/A |
| Comb-4 | N/A | {0,2} | {0,2,1,3} | {0,2,1,3, 0,2,1,3} | {0,2,1,3,0,2,1,3,0,2,1,3} |
| Comb-8 | N/A | N/A | {0,4,2,6} | {0,4,2,6,1, 5,3,7} | {0,4,2,6,1,5,3,7,0,4,2,6} |

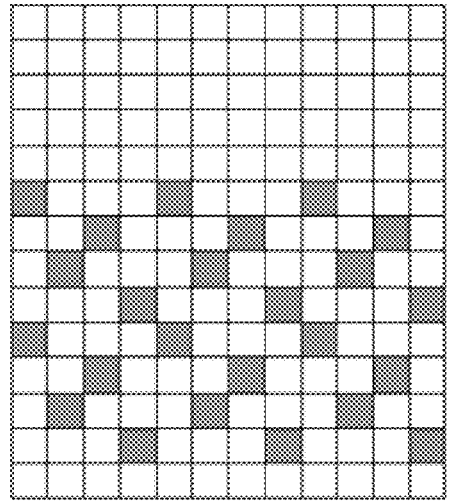
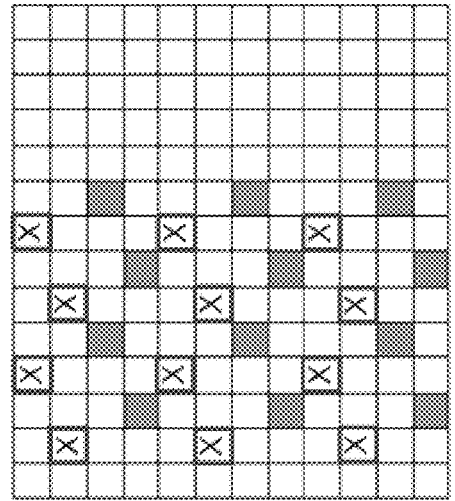
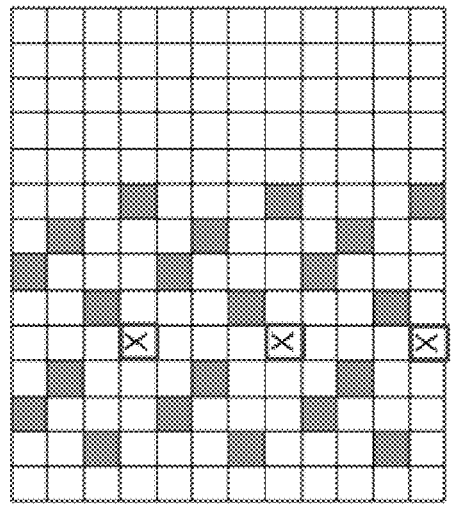
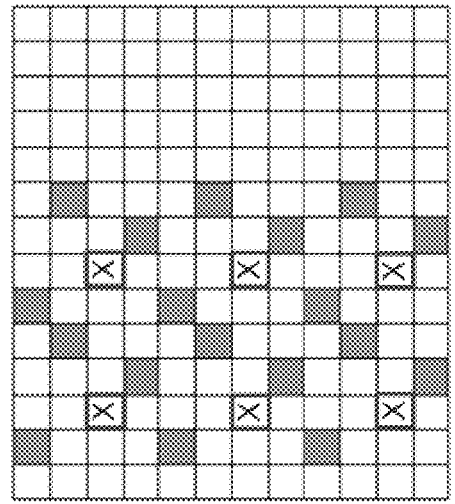
FIG. 5

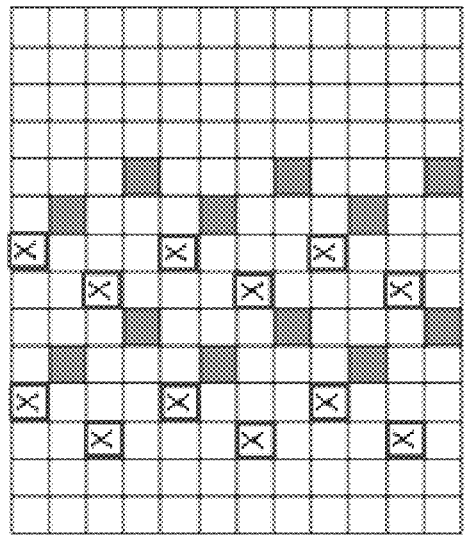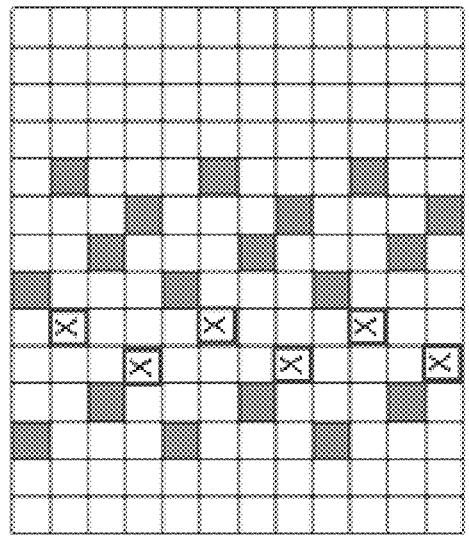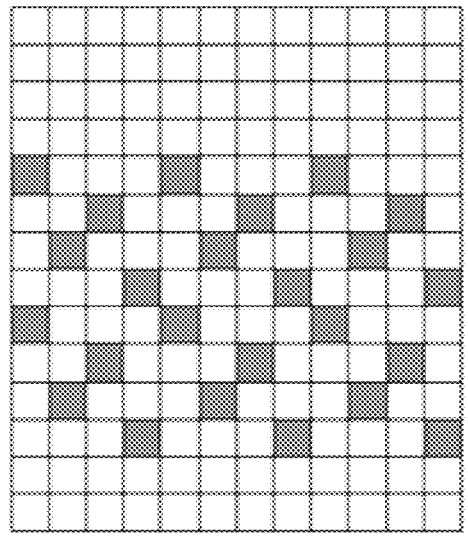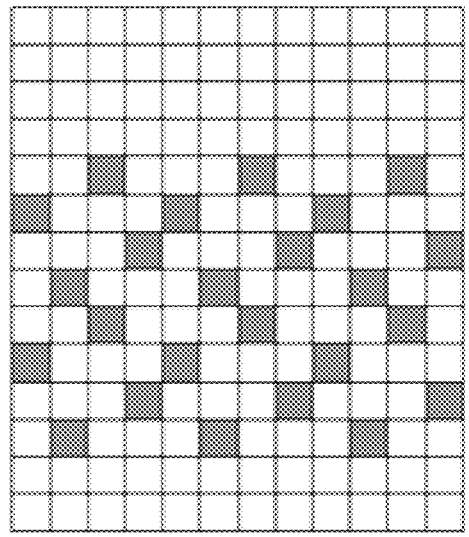
FIG. 6

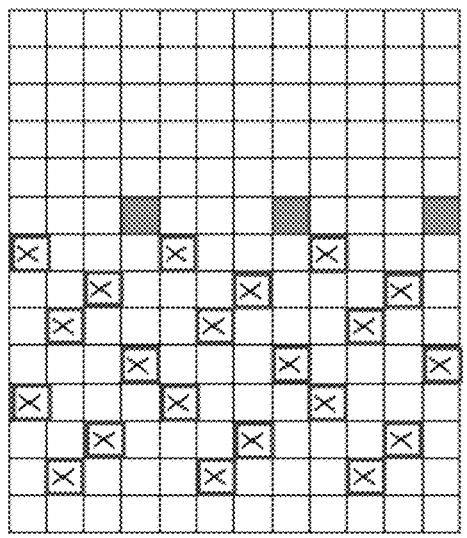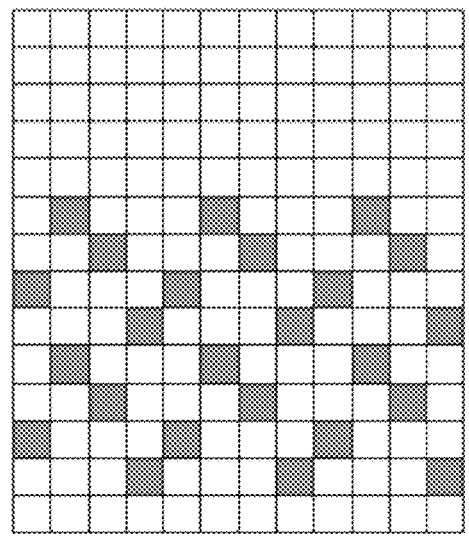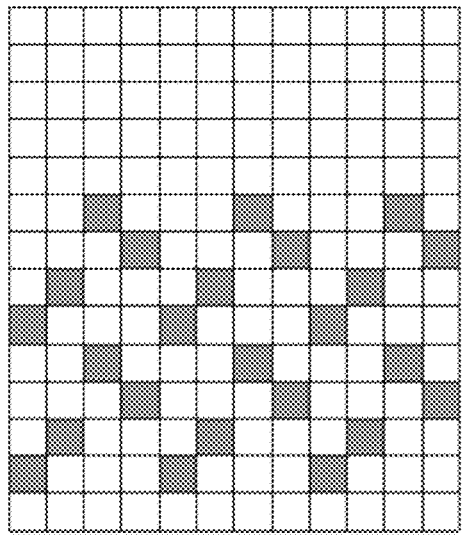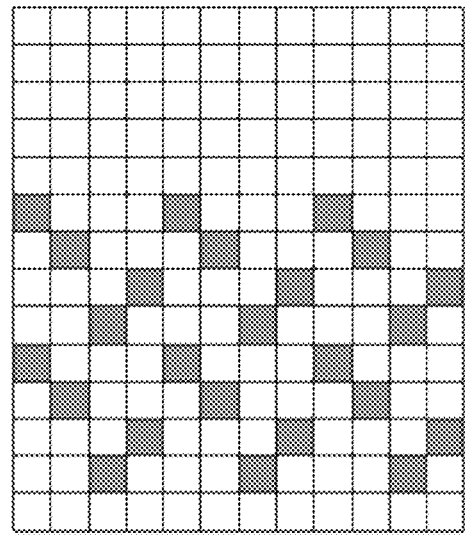
FIG. 7

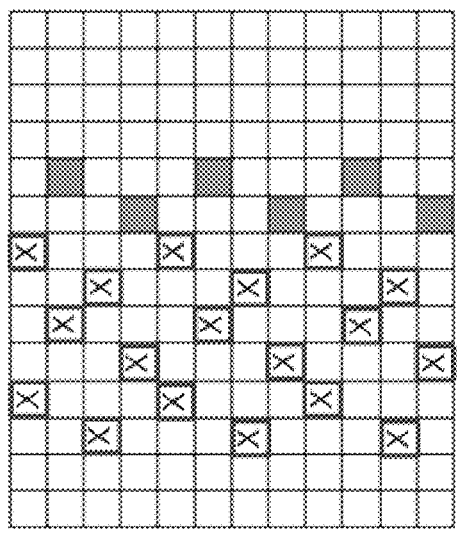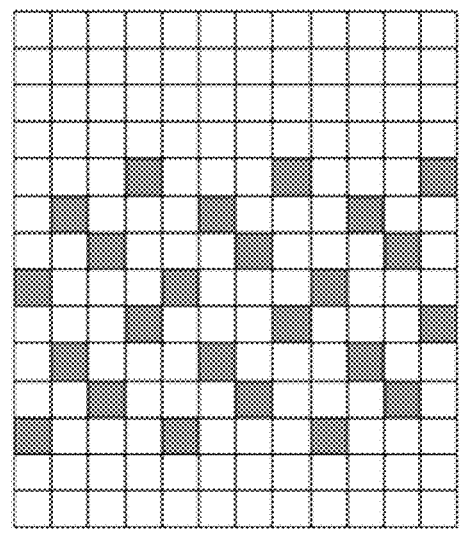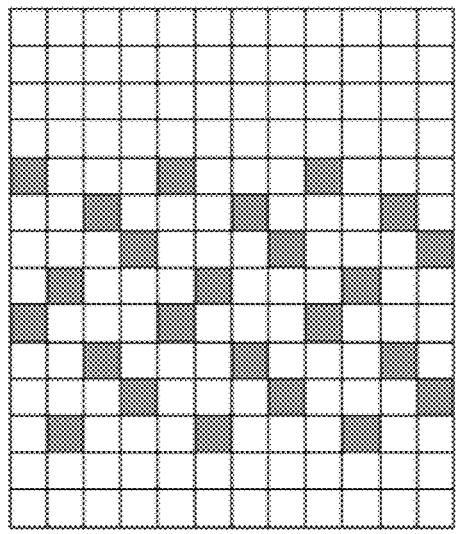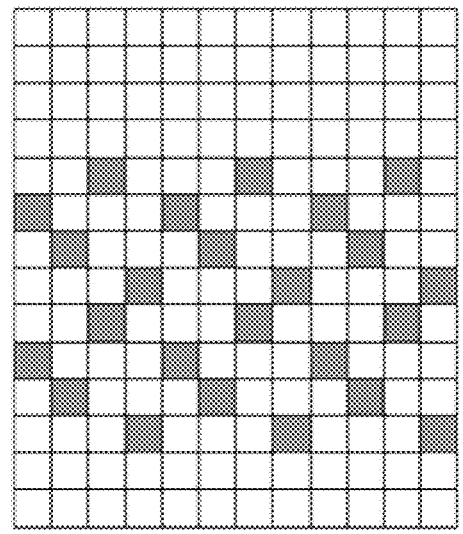
FIG. 8

1900

configuring, by a wireless communication node, a resource mapping pattern for a reference signal
1902 updating, by the wireless communication node based on a time-domain position of the reference signal, the resource mapping pattern by changing a sequence that represents a plurality of frequency-domain offsets of the reference signal relative to a frequency-domain position of the reference signal
1904

receiving, by a wireless communication device, a resource mapping pattern for a reference signal
2002 updating, by the wireless communication device based on a time-domain position of the reference signal, the resource mapping pattern by changing a sequence that represents a plurality of frequency-domain offsets of the reference signal relative to a frequency-domain position of the reference signal
2004

FIG. 20

SYSTEMS AND METHODS FOR INTERFERENCE MANAGEMENT

CROSS-REFERENCE TO RELATED APPLICATION

This application claims the benefit of priority under 35 U.S.C. § 120 as a continuation of PCT Patent Application No. PCT/CN2020/119637, filed on Sep. 30, 2020, the disclosure of which is incorporated herein by reference in its entirety.

TECHNICAL FIELD

The disclosure relates generally to wireless communications and, more particularly, to systems and methods for interference management.

BACKGROUND

The 3rd Generation Partnership Project (3GPP), which has developed the most successful standard technologies in the mobile communication market such as Universal Mobile Telecommunication System (UMTS) and Long-Term Evolution (LTE), is currently carrying out the standardization of Fifth Generation (5G) mobile communication technology. Within 3GPP, Service and System Aspects Working Group 2 (SA2) is responsible for identifying the main functions and entities of the network.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, a method includes configuring, by a wireless communication node, a resource mapping pattern for a reference signal. In some embodiments, the method includes the updating, by the wireless communication node based on a time-domain position of the reference signal, the resource mapping pattern by changing a sequence that represents a plurality of frequency-domain offsets of the reference signal relative to a frequency-domain position of the reference signal.

In another aspect, a method includes receiving, by a wireless communication device, a resource mapping pattern for a reference signal. In some embodiments, the method includes updating, by the wireless communication device based on a time-domain position of the reference signal, the resource mapping pattern by changing a sequence that represents a plurality of frequency-domain offsets of the reference signal relative to a frequency-domain position of the reference signal.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5 illustrates example time-frequency maps for Case 1-1, in accordance with the conventional system.

FIG. 6 illustrates example time-frequency maps for Case 1-1, in accordance with the conventional system.

FIG. 7 illustrates example time-frequency maps for Case 2-1, in accordance with an embodiment of the present disclosure.

FIG. 8 illustrates example time-frequency maps for Case 2-1, in accordance with an embodiment of the present disclosure.

FIG. 19 is a flow diagram depicting a method for interference management, in accordance with some embodiments of the present disclosure.

FIG. 20 is a flow diagram depicting a method for interference management, in accordance with some embodiments of the present disclosure

DETAILED DESCRIPTION OF EXEMPLARY EMBODIMENTS

Figure 1A:
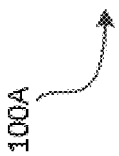
FIG. 1A illustrates a table of example combinations of {Number of symbols, Comb size, and/or Frequency offset} that correspond to a configuration for a DL PRS resource, in accordance with the conventional system.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:
3GPP 3rd Generation Partnership Project
5G 5th Generation Mobile Networks
5G-AN 5G Access Network
5G gNB Next Generation NodeB
BS Base Station
CAG Closed Access Group
CE Control Element
DL Down Link or Downlink
eNB Evolved Node B
ETSI European Telecommunications Standards Institute
LBT Listen Before Talk/Listen Before Send
LTE Long Term Evolution
MAC Medium Access Control
MSC Mobile Switching Center
NAS Non-Access Stratum
NR Next Generation RAN
OFDM Orthogonal Frequency-Division Multiplexing
OFDMA Orthogonal Frequency-Division Multiple Access
OSI Open Systems Interconnection
PDCP Packet Data Convergence Protocol
PRS Positioning Reference Signal
RAN Radio Access Network
RE Resource Element
RLC Radio Link Control
RNTI radio Network Temporary Identifier
RRC Radio Resource Control
RV Redundancy Version
UE User Equipment
UL Up Link or Uplink Positioning Reference Signals (PRS) have been introduced in the 3GPP standard to allow proper timing and/or angle measurements of a UE from base station (BS) signals (i.e. DL PRS) to improve positioning performance. The standard also allows proper timing and/or angle measurements of base station (BS) from UE signals (i.e. UL PRS). In the conventional design of PRS, the resource element (RE) occupation within the resource blocks is determined by according to parameters for a PRS resource. Specifically, an parameter (sometimes referred to as, "a time-domain position of a reference signal") that corresponds to the starting symbol of a PRS resource within a slot; an 'N' parameter (sometimes referred to as, "a total time-domain number of time-domain symbols" or "number of symbols") that corresponds to the number of symbols per PRS resource within a slot; a 'C' parameter (sometimes referred to as, "a frequency-domain period" or "comb size") that corresponds to the resource element spacing in each symbol of the PRS resource; a 'K' parameter that corresponds to the Resource element (RE) offset in the frequency domain for the first symbol in a PRS resource; and an 'S' parameter (sometimes referred to as, "a sequence" or "frequency offset") that corresponds to the relative RE offsets of all symbols that are defined relative to the RE Offset in the frequency domain of the first symbol in a PRS resource.

The combinations of {Number of symbols, Comb size, and/or Frequency offset}, in some embodiments, can correspond to a configuration for a downlink (DL) PRS resource. For example, FIG. 1A illustrates a table of example combinations of {Number of symbols, Comb size, and/or Frequency offset} that correspond to a configuration for a DL (downlink) PRS resource, in accordance with the conventional system. Although the table 100 in FIG. 1A only shows a select number of symbols, comb sizes, and frequency offsets, a network (e.g., BS 202 in FIG. 2) and/or a UE (UE 204 in FIG. 2) may support combinations for any other number of symbols, comb sizes, and frequency offsets.

Figure 1B:
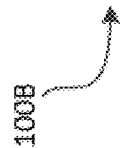
FIG. 1B illustrates a table of example combinations of {Number of symbols, Comb size, and/or Frequency offset} that correspond to a configuration for a UL PRS resource, in accordance with the conventional system.

The combinations of {Number of symbols, Comb size, and/or Frequency offset}, in some embodiments, can correspond to a configuration for an uplink (UL) PRS resource. For example, FIG. 1B illustrates a table of example combinations of {Number of symbols, Comb size, and/or Frequency offset} that correspond to a configuration for a UL (downlink) PRS resource, in accordance with the conventional system. Although the table 100 in FIG. 1B only shows a select number of symbols, comb sizes, and frequency offsets, a network (e.g., BS 202 in FIG. 2) and/or a UE (UE 204 in FIG. 2) may support combinations for any other number of symbols, comb sizes, and frequency offsets.

The conventional system maps a PRS in patterns with shifts in frequency and time. However, the resource mapping mechanism of the conventional system has a high possibility to cause an overlap in the time and frequency domain, such that PRS resources will interfere with one another, leading to a performance degradation for the network. Especially when many PRS resources are transmitted in some overlapped symbols, the receiver side may be hard to estimate channel under high interference REs.

Accordingly, the present disclosure is directed to systems and methods for enhancing the PRS design in order to eliminate and/or mitigate PRS resource interference.

1. Mobile Communication Technology and Environment

Figure 2:
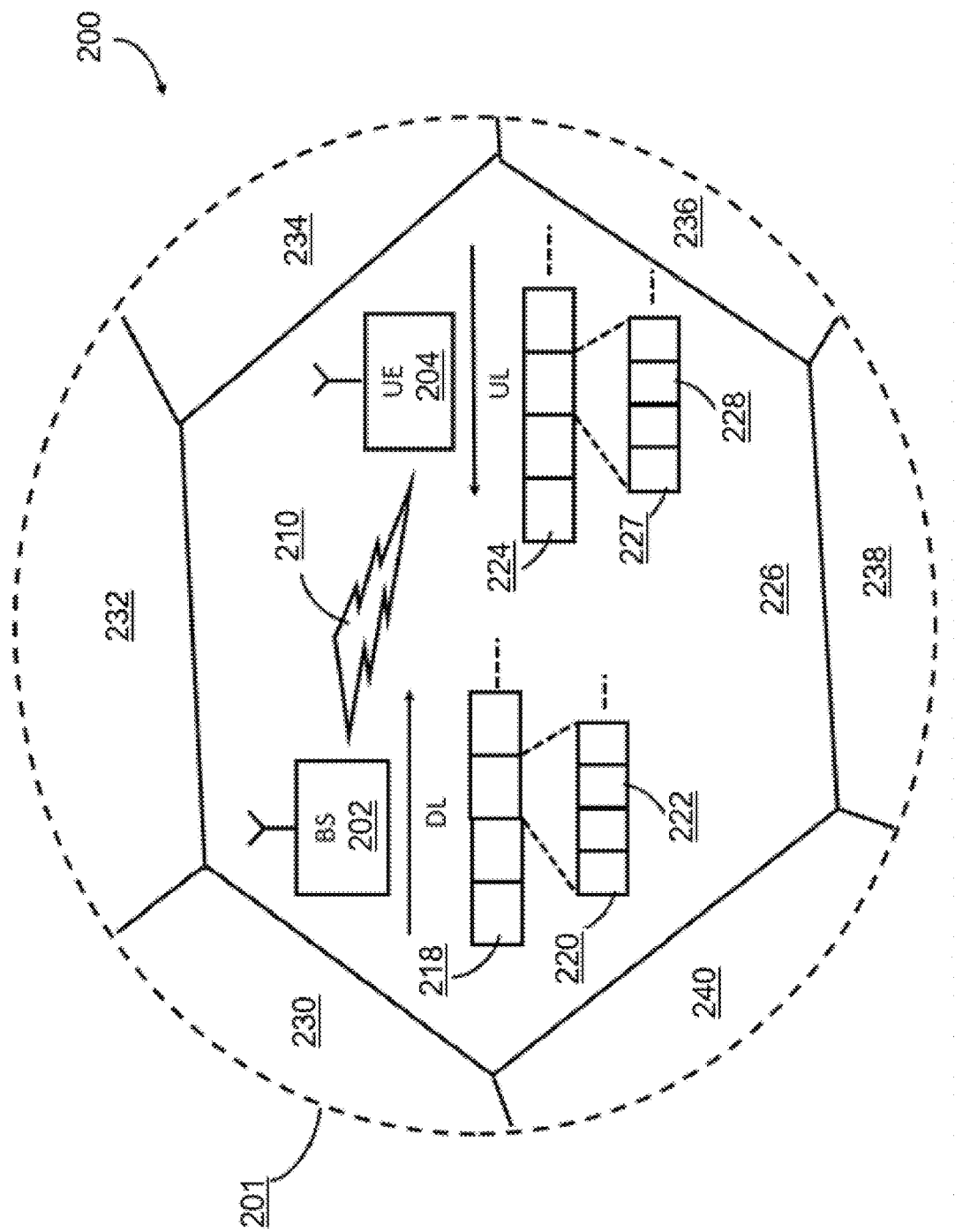
FIG. 2 illustrates an example cellular communication network in which techniques disclosed herein may be implemented, in accordance with an embodiment of the present disclosure.

FIG. 2 illustrates an example wireless communication network, and/or system, 200 in which techniques disclosed herein may be implemented, in accordance with an embodiment of the present disclosure. In the following discussion, the wireless communication network 200 may be any wireless network, such as a cellular network or a narrowband Internet of things (NB-IoT) network and is herein referred to as "network 200." Such an example network 200 includes a base station 202 (hereinafter "BS 202"; also referred to as wireless communication node) and a user equipment device 204 (hereinafter "UE 204"; also referred to as wireless communication device) that can communicate with each other via a communication link 210 (e.g., a wireless communication channel), and a cluster of cells 226, 230, 232, 234, 236, 238 and 240 overlaying a geographical area 201. In FIG. 2, the BS 202 and UE 204 are contained within a respective geographic boundary of cell 226. Each of the other cells 230, 232, 234, 236, 238 and 240 may include at least one base station operating at its allocated bandwidth to provide adequate radio coverage to its intended users.

For example, the BS 202 may operate at an allocated channel transmission bandwidth to provide adequate coverage to the UE 204. The BS 202 and the UE 204 may communicate via a downlink radio frame 218, and an uplink radio frame 224 respectively. Each radio frame 218/224 may be further divided into sub-frames 220/227 which may include data symbols 222/228. In the present disclosure, the BS 202 and UE 204 are described herein as non-limiting examples of "communication nodes," generally, which can practice the methods disclosed herein. Such communication nodes may be capable of wireless and/or wired communications, in accordance with various embodiments of the present solution.

Figure 3:
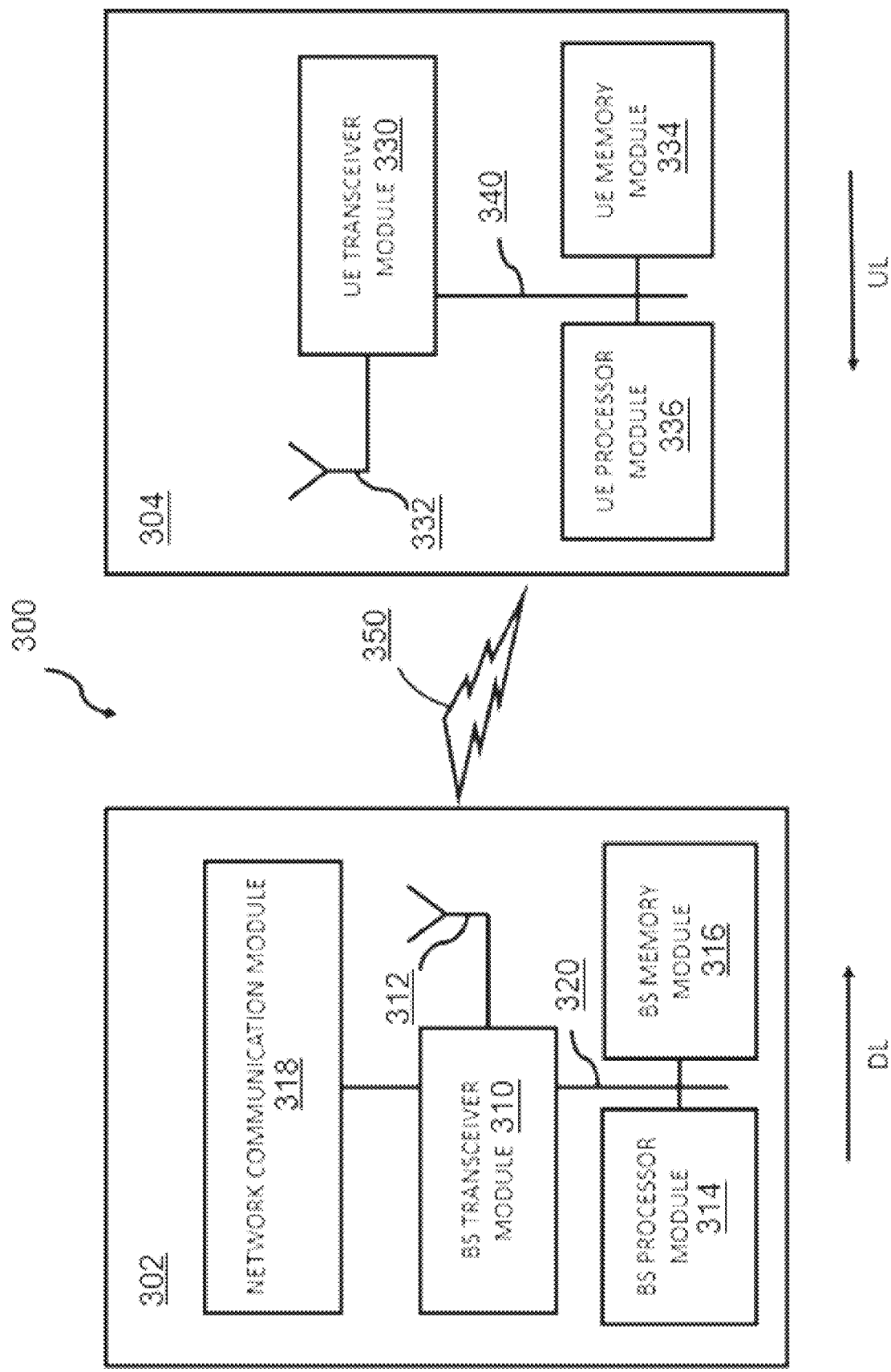
FIG. 3 illustrates block diagrams of an example base station and a user equipment device, in accordance with some embodiments of the present disclosure.

FIG. 3 illustrates a block diagram of an example wireless communication system 300 for transmitting and receiving wireless communication signals (e.g., OFDM/OFDMA signals) in accordance with some embodiments of the present solution. The system 300 may include components and elements configured to support known or conventional operating features that need not be described in detail herein. In one illustrative embodiment, system 300 can be used to communicate (e.g., transmit and receive) data symbols in a wireless communication environment such as the wireless communication environment 300 of FIG. 3, as described above.

System 300 generally includes a base station 302 (hereinafter "BS 302") and a user equipment device 304 (hereinafter "UE 304"). The BS 302 includes a BS (base station) transceiver module 310, a BS antenna 312, a BS processor module 314, a BS memory module 316, and a network communication module 318, each module being coupled and interconnected with one another as necessary via a data communication bus 320. The UE 304 includes a UE (user equipment) transceiver module 330, a UE antenna 332, a UE memory module 334, and a UE processor module 336, each module being coupled and interconnected with one another as necessary via a data communication bus 340. The BS 302 communicates with the UE 304 via a communication channel 350, which can be any wireless channel or other medium suitable for transmission of data as described herein.

As would be understood by persons of ordinary skill in the art, system 300 may further include any number of modules other than the modules shown in FIG. 3. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 330 may be referred to herein as an "uplink" transceiver 330 that includes a radio frequency (RF) transmitter and a RF receiver each comprising circuitry that is coupled to the antenna 332. A duplex switch (not shown) may alternatively couple the uplink transmitter or receiver to the uplink antenna in time duplex fashion. Similarly, in accordance with some embodiments, the BS transceiver 310 may be referred to herein as a "downlink" transceiver 310 that includes a RF transmitter and a RF receiver each comprising circuitry that is coupled to the antenna 312. A downlink duplex switch may alternatively couple the downlink transmitter or receiver to the downlink antenna 312 in time duplex fashion. The operations of the two transceiver modules 310 and 330 may be coordinated in time such that the uplink receiver circuitry is coupled to the uplink antenna 332 for reception of transmissions over the wireless transmission link 350 at the same time that the downlink transmitter is coupled to the downlink antenna 312. Conversely, the operations of the two transceivers 310 and 330 may be coordinated in time such that the downlink receiver is coupled to the downlink antenna 312 for reception of transmissions over the wireless transmission link 350 at the same time that the uplink transmitter is coupled to the uplink antenna 332. In some embodiments, there is close time synchronization with a minimal guard time between changes in duplex direction.

The UE transceiver 330 and the base station transceiver 310 are configured to communicate via the wireless data communication link 350 and cooperate with a suitably configured RF antenna arrangement 312/332 that can support a particular wireless communication protocol and modulation scheme. In some illustrative embodiments, the UE transceiver 310 and the base station transceiver 310 are configured to support industry standards such as the Long-Term Evolution (LTE) and emerging 5G standards, and the like. It is understood, however, that the present disclosure is not necessarily limited in application to a particular standard and associated protocols. Rather, the UE transceiver 330 and the base station transceiver 310 may be configured to support alternate, or additional, wireless data communication protocols, including future standards or variations thereof.

In accordance with various embodiments, the BS 302 may be an evolved node B (eNB), a serving eNB, a target eNB, a femto station, or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 310 and 330, respectively, such that the processors modules 310 and 330 can read information from, and write information to, memory modules 316 and 334, respectively. The memory modules 316 and 334 may also be integrated into their respective processor modules 310 and 330. In some embodiments, the memory modules 316 and 334 may each include a cache memory for storing temporary variables or other intermediate information during execution of instructions to be executed by processor modules 310 and 330, respectively. Memory modules 316 and 334 may also each include non-volatile memory for storing instructions to be executed by the processor modules 310 and 330, respectively.

The network communication module 318 generally represents the hardware, software, firmware, processing logic, and/or other components of the base station 302 that enable bi-directional communication between base station transceiver 310 and other network components and communication nodes configured to communication with the base station 302. For example, network communication module 318 may be configured to support internet or WiMAX traffic. In a typical deployment, without limitation, network communication module 318 provides an 802.3 Ethernet interface such that base station transceiver 310 can communicate with a conventional Ethernet based computer network. In this manner, the network communication module 318 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non-Access Stratum (NAS) layer or an Internet Protocol (IP) layer, and the seventh layer being the other layer.

2. Mapping of Uplink PRS Resources

This portion of the present disclosure discusses the mapping of uplink (UL) PRS resources.

2.1. Conventional Mapping Mechanism (Case 1-1)

Figure 4:
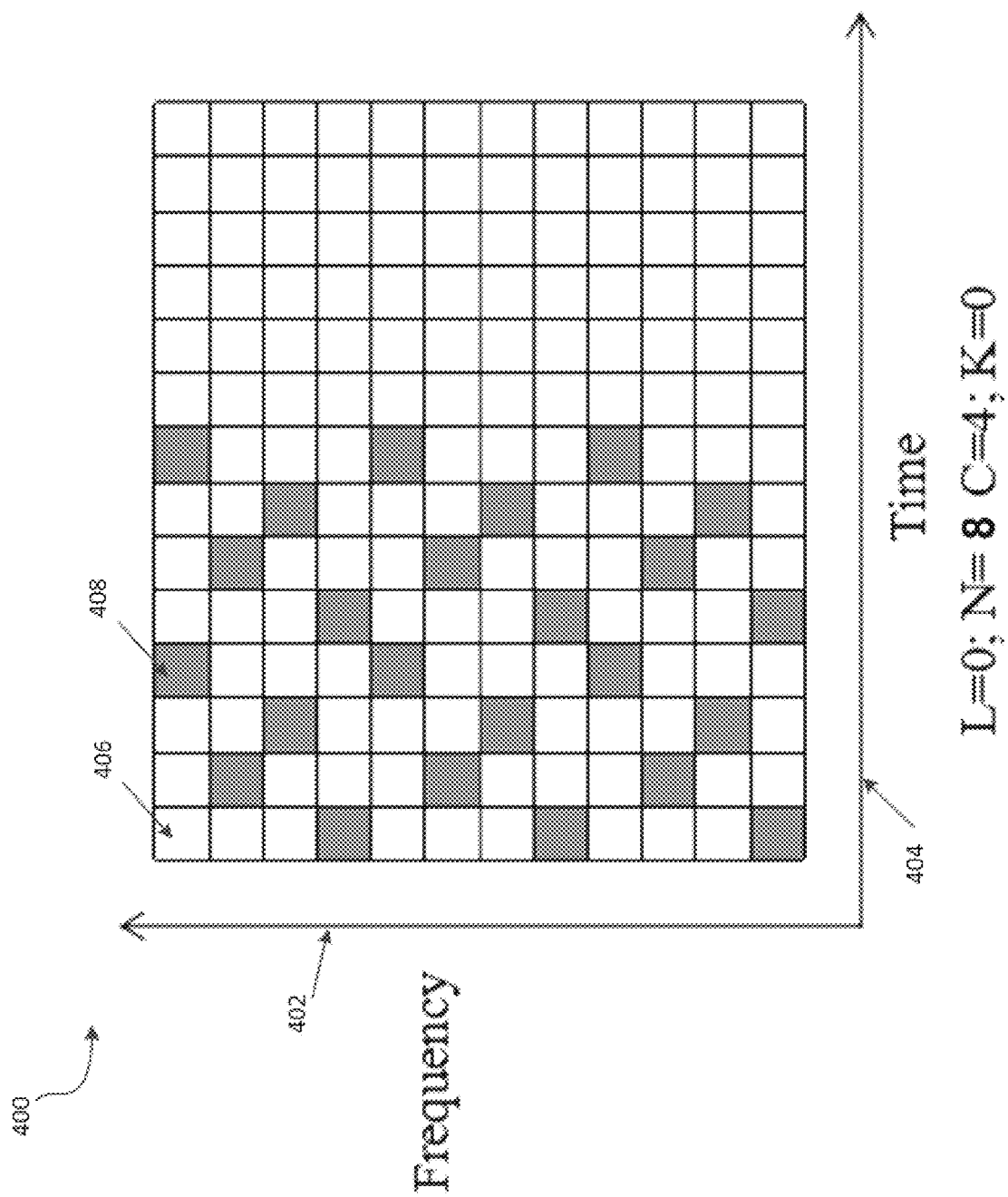
FIG. 4 illustrates an example time-frequency map for Case 1-1, in accordance with the conventional system.

First UL PRS configuration has the following parameters: L=0; N=8; C=4; K=0; resulting in a frequency offset that is S={0,2,1,3, 0,2,1,3} that defines a particular UL PRS resource, and the corresponding resource mapping pattern is shown in FIG. 4. For example, FIG. 4 illustrates a resource mapping pattern based on the first UL PRS configuration, in accordance with the conventional system. The time-frequency map 400 includes a frequency axis 402 that corresponds to subcarriers in a resource block (RB) and a time axis 404 that corresponds to symbols in a slot. The time-frequency map 400 includes a plurality of resource elements that each correspond to a subcarrier and a symbol, depending on where positioned on the time-frequency map 400. As shown in FIG. 4, a resource element may be unmapped (shown in FIG. 4 as a 'white box', such as RE 406) or mapped (shown in FIG. 4 as a 'dark box', such as RE 408), according to the aforementioned resource mapping pattern. The 'L' parameter that corresponds to the starting symbol of a PRS resource within a slot (e.g. L=0 means the starting symbol of a PRS resource within a slot is the first symbol); an 'N' parameter that corresponds to the number of symbols per PRS resource within a slot (e.g. N=8 means the number of symbols per PRS resource within a slot is 8); a 'C' parameter that corresponds to the resource element spacing in each symbol of the PRS resource (e.g. C=4 means resource element spacing in each symbol of the PRS resource is 4); a 'K' parameter that corresponds to the resource element (RE) offset in the frequency domain for the first symbol in a PRS resource (e.g. K=0 means the resource element (RE) offset in the frequency domain for the first symbol in a PRS resource is 1); and an 'S' parameter that corresponds to the relative RE offsets of all symbols that are defined relative to the RE Offset in the frequency domain of the first symbol in a PRS resource. (e.g. S={0,2,1,3, 0,2,1,3} means the relative RE offset of starting symbol (or first symbol) of the PRS resource to K is 0; the relative RE offset of second symbol of the PRS resource to K is 2; the relative RE offset of third symbol of the PRS resource to K is 1 . . . )

If a second UL PRS configuration have following parameters, L=1; N=8; C=4; K=0,1,2,3, there are 4 different UL PRS resources depend on different values of K, the corresponding resource mapping patterns are as shown in FIG. 5, where some of UL PRS resources (i.e., when K=1,2,3) collide (e.g., interfere) with the UL PRS resource in FIG. 4 in some mapped resource elements (REs).

FIG. 5 illustrates 4 resource mapping patterns based on the second UL PRS configuration, in accordance with the conventional system. As shown, a resource element in each of the time-frequency maps may be unmapped (shown in FIG. 5 as a 'white box') or mapped (shown in FIG. 5 as a 'dark box') according to the second UL PRS configuration. The mapped resource elements (REs) that interfere with mapped resource elements (REs) in FIG. 4 are marked with 'X'.

If a third UL PRS configuration have following parameters, L=2; N=8; C=4; K=0,1,2,3, there are 4 different UL PRS resources depend on different values of K, the corresponding resource mapping patterns are as shown in FIG. 6, where some of UL PRS resources (i.e., when K=1,3) collide (e.g., interfere) with the UL PRS resource in FIG. 4 in some mapped resource elements (REs).

FIG. 6 illustrates 4 resource mapping patterns based on the second UL PRS configuration, in accordance with the conventional system. As shown, a resource element in each of the time-frequency maps may be unmapped (shown in FIG. 6 as a 'white box') or mapped (shown in FIG. 6 as a 'dark box') according to the second UL PRS configuration. The mapped resource elements (REs) that interfere with mapped resource elements (REs) in FIG. 4 are marked with 'X'.

2.2. Enhanced Mapping Mechanism (Case 2-1)

This portion of the present disclosure is directed an enhanced mapping mechanism that eliminates and/or mitigates the technical problems associated with the conventional mapping mechanism of Case 1-1, as discussed herein.

The frequency offset (S), in some embodiments, may be determined by a number of symbols (N) and/or comb size (C) in the conventional design (sometimes referred to herein as, "conventional system"). In order to mitigate the interference, in some embodiments, the frequency offset can also depend on the starting symbol of the PRS within a slot (L).

In some embodiments, the BS and/or UE may rotate each element of frequency offset to the left by the number of L (the starting symbol of the PRS within a slot). Or in other words, performing a left circular shift on each element of the sequence (or "frequency offset" by the time-domain position of the reference signal (or "the starting symbol of the PRS within a slot"). For example, if the frequency offset is S={0,3,1,4,2,5}, when L=0, the frequency offset is unchanged; L=1, the frequency offset is replaced by S={3, 1,4,2,5,0}; L=2, the frequency offset is replaced by S={1, 4,2,5,0,3}; etc.

In some embodiments, the BS and/or UE may rotate each element of frequency offset to the right by the number of L (the starting symbol of the PRS within a slot). Or in other words, performing a right circular shift on each element of the sequence (or "frequency offset" by the time-domain position of the reference signal (or "the starting symbol of the PRS within a slot"). For example, if the frequency offset is S={0,3,1,4,2,5}, when L=0, the frequency offset is unchanged; L=1, the frequency offset is replaced by S={5, 0,3,1,4,2}; L=2, the frequency offset is replaced by S={2, 5,0,3,1,4}; etc.

In some embodiments, whether the rotation is applicable can be configured by signaling. In some embodiments, whether the rotation is on the left or on the right can be configured by signaling. In some embodiments, the rotation may not be applied to the cases when C=2. In some embodiments, the rotation may not be applied to the cases when N=2.

For the enhanced mapping mechanism of Case 2-1, in some embodiments, all the configurations are the same as the conventional mapping mechanism of the second UL PRS configuration in Case 1-1 (as discussed above), except for the frequency offset (assume the rotation is on the left in this case). That is, compared to the second UL PRS resource in the conventional mapping mechanism of Case 1-1, the frequency offset may be replaced by S={2,1,3, 0,2,1,3,0} since the starting symbol of the PRS within a slot is L=1.

As a result, there are 4 different UL PRS resources depend on different values of K (i.e. K=0,1,2,3), the corresponding resource mapping patterns are as shown in FIG. 7, where only the one UL PRS resource (i.e. when K=0) has mapped resource elements that collide (e.g., interfere) with the mapped resource elements in FIG. 4. Therefore, it's easier for scheduler to avoid interference among different PRS resources.

FIG. 7 illustrates example time-frequency maps for Case 2-1, in accordance with an embodiment of the present disclosure. As shown, a resource element in each of the time-frequency maps may be unmapped (shown in FIG. 7 as a 'white box') or mapped (shown in FIG. 7 as a 'dark box'). The mapped resource elements (REs) that interfere with mapped resource elements (REs) in FIG. 4 are marked with 'X'.

For the enhanced mapping mechanism of Case 2-1, in some embodiments, all the configurations are the same as the conventional mapping mechanism of the third UL PRS configuration in Case 1-1 (as discussed above), except for the frequency offset (assume the rotation is on the left in this case). That is, compared to the third UL PRS resource in the conventional mapping mechanism of Case 1-1, the frequency offset may be replaced by S={1,3, 0,2,1,3,0,2} since the starting symbol of the PRS within a slot is L=2.

As a result, there are 4 different UL PRS resources depend on different values of K (i.e. K=0,1,2,3), the corresponding resource mapping patterns are as shown in FIG. 8, where only the one UL PRS resource (i.e. when K=0) has mapped resource elements that collide (e.g., interfere) with the mapped resource elements in FIG. 4. Therefore, it's easier for scheduler to avoid interference among different PRS resources.

FIG. 8 illustrates example time-frequency maps for Case 2-1, in accordance with an embodiment of the present disclosure. As shown, a resource element in each of the time-frequency maps may be unmapped (shown in FIG. 8 as a 'white box') or mapped (shown in FIG. 8 as a 'dark box'). The mapped resource elements (REs) that interfere with mapped resource elements (REs) in FIG. 4 are marked with 'X'.

3. Mapping of Downlink PRS Resources when L=0, N=6, C=6, K=0

This portion of the present disclosure discusses the mapping of downlink (DL) PRS resources when L=0, N=6, C=6, K=0.

3.1. Conventional Mapping Mechanism (Case 1-2)

Figure 9:
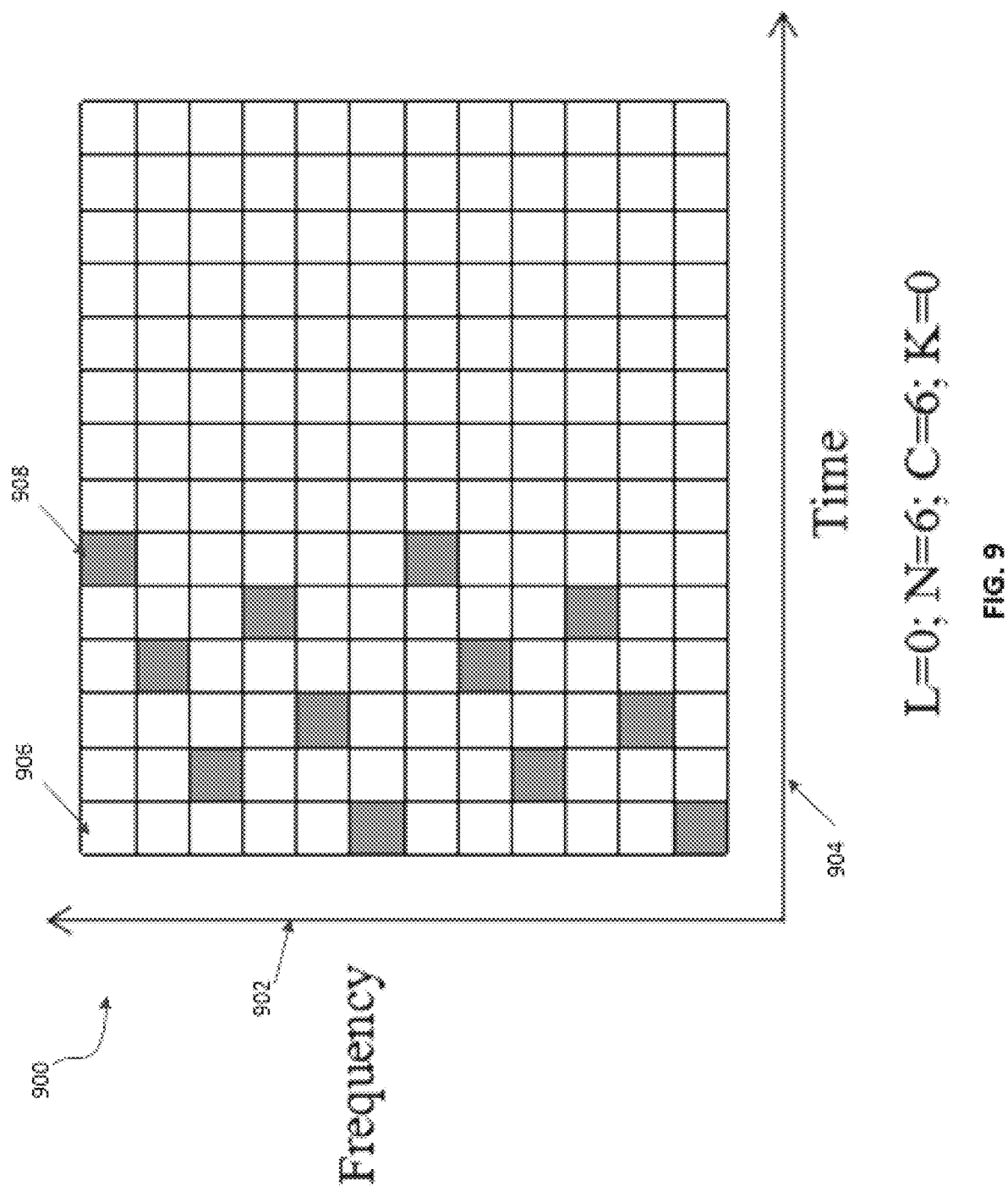
FIG. 9 illustrates an example time-frequency map for Case 1-2, in accordance with the conventional system.

First DL PRS configuration has the following parameters: L=0; N=6; C=6; K=0; resulting in a frequency offset that is S={0,3,1,4,2,5} that defines a particular DL PRS resource, and the corresponding resource mapping pattern is shown in FIG. 9. For example, FIG. 9 illustrates a resource mapping pattern based on the first DL PRS configuration, in accordance with the conventional system. The time-frequency map 900 includes a frequency axis 902 that corresponds to subcarriers in a resource block (RB) and a time axis 904 that corresponds to symbols in a slot. The time-frequency map 900 includes a plurality of resource elements that each correspond to a subcarrier and a symbol, depending on where positioned on the time-frequency map 900. As shown in FIG. 9, a resource element may be unmapped (shown in FIG. 9 as a 'white box', such as RE 906) or mapped (shown in FIG. 9 as a 'dark box', such as RE 908), according to the aforementioned resource mapping pattern. The 'L' parameter that corresponds to the starting symbol of a PRS resource within a slot (e.g. L=0 means the starting symbol of a PRS resource within a slot is the first symbol); an 'N' parameter that corresponds to the number of symbols per PRS resource within a slot (e.g. N=6 means the number of symbols per PRS resource within a slot is 6); a 'C' parameter that corresponds to the resource element spacing in each symbol of the PRS resource (e.g. C=6 means resource element spacing in each symbol of the PRS resource is 6); a 'K' parameter that corresponds to the resource element (RE) offset in the frequency domain for the first symbol in a PRS resource (e.g. K=0 means the resource element (RE) offset in the frequency domain for the first symbol in a PRS resource is 1); and an 'S' parameter that corresponds to the relative RE offsets of all symbols that are defined relative to the RE Offset in the frequency domain of the first symbol in a PRS resource. (e.g. S={0,3,1,4,2,5} means the relative RE offset of starting symbol (or first symbol) of the PRS resource to K is 0; the relative RE offset of second symbol of the PRS resource to K is 3; the relative RE offset of third symbol of the PRS resource to K is 1 . . . )

If a second UL PRS configuration have following parameters, L=2; N=6; C=6; K=0,1,2,3,4,5, there are 6 different DL PRS resources depend on different values of K, the corresponding resource mapping patterns are as shown in FIG. 10, where some of DL PRS resources (i.e., when K=3,4) collide (e.g., interfere) with the DL PRS resource in FIG. 9 in some mapped resource elements (REs).

Figure 10:
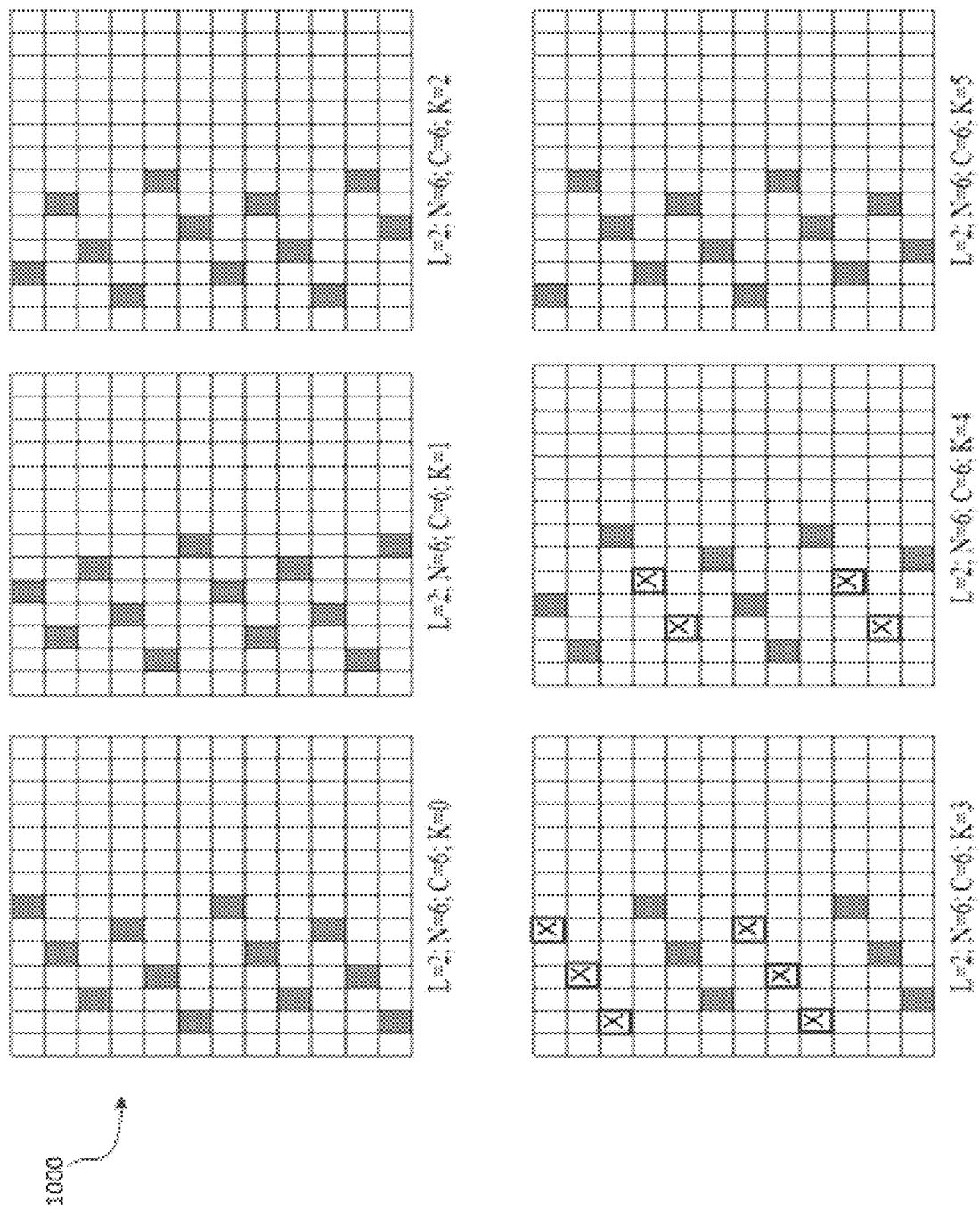
FIG. 10 illustrates example time-frequency maps for Case 1-2, in accordance with the conventional system.

FIG. 10 illustrates 6 resource mapping patterns based on the second DL PRS configuration, in accordance with the conventional system. As shown, a resource element in each of the time-frequency maps may be unmapped (shown in FIG. 10 as a 'white box') or mapped (shown in FIG. 10 as a 'dark box') according to the second DL PRS configuration. The mapped resource elements (REs) that interfere with mapped resource elements (REs) in FIG. 9 are marked with 'X'.

If a third DL PRS configuration have following parameters, L=2; N=6; C=6; K=0,1,2,3,4,5 there are 6 different DL PRS resources depend on different values of K, the corresponding resource mapping patterns are as shown in FIG. 11, where one DL PRS resource (i.e., when K=1) collides (e.g., interferes) with the DL PRS resource in FIG. 9 in some mapped resource elements (REs).

Figure 11:
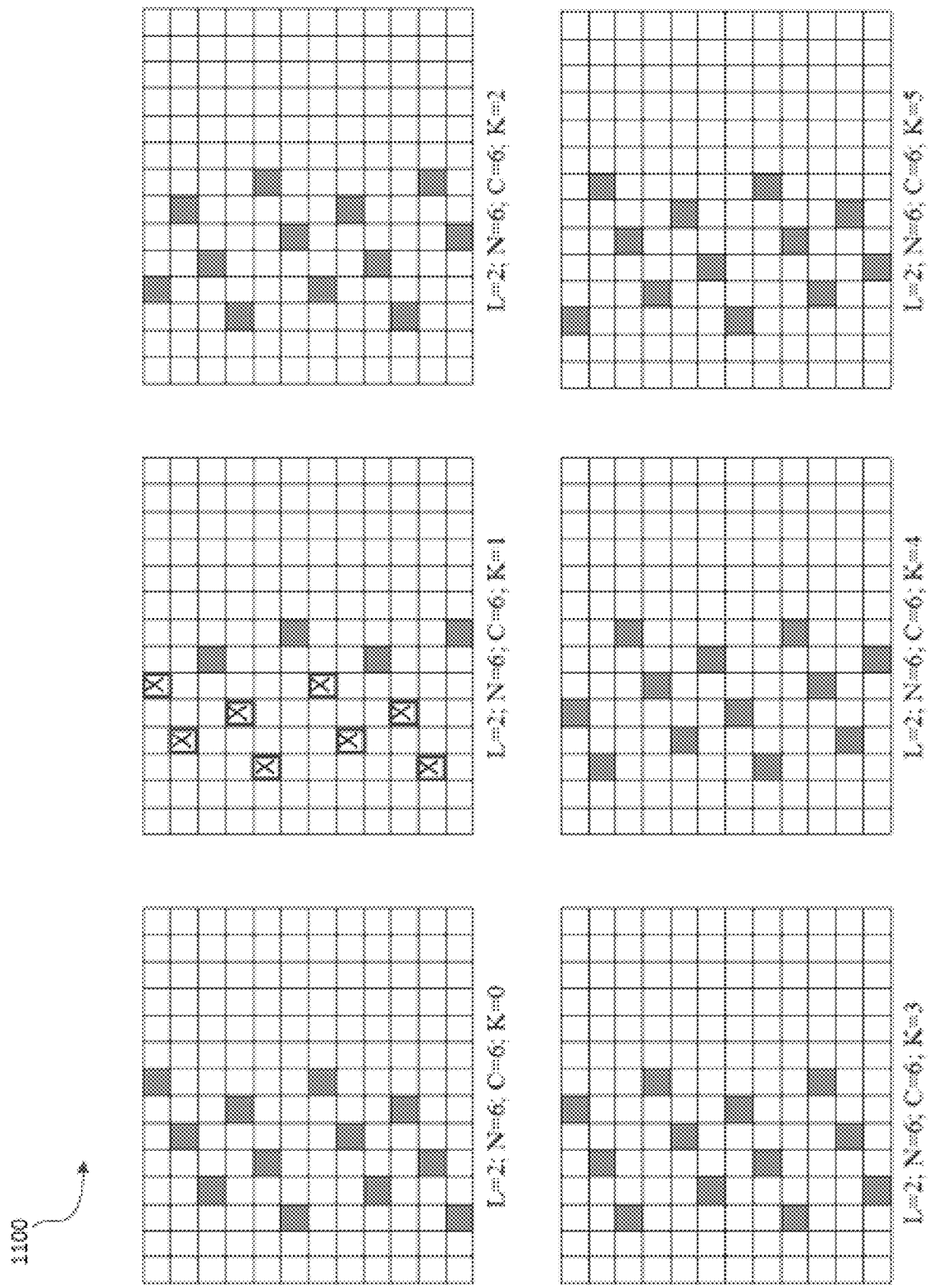
FIG. 11 illustrates example time-frequency maps for Case 1-2, in accordance with the conventional system.

FIG. 11 illustrates 6 resource mapping patterns based on the second DL PRS configuration, in accordance with the conventional system. As shown, a resource element in each of the time-frequency maps may be unmapped (shown in FIG. 11 as a 'white box') or mapped (shown in FIG. 11 as a 'dark box') according to the second DL PRS configuration. The mapped resource elements (REs) that interfere with mapped resource elements (REs) in FIG. 9 are marked with 'X'.

3.2. Enhanced Mapping Mechanism (Case 2-2)

This portion of the present disclosure is directed an enhanced mapping mechanism that eliminates and/or mitigates the technical problems associated with the conventional mapping mechanism of Case 1-2, as discussed herein.

The frequency offset (S), in some embodiments, may be determined by a number of symbols (N) and/or comb size (C) in the conventional design (sometimes referred to herein as, "conventional system"). In order to mitigate the interference, in some embodiments, the frequency offset can also depend on the starting symbol of the PRS within a slot (L).

In some embodiments, the BS and/or UE may rotate each element of frequency offset to the left by the number of L (the starting symbol of the PRS within a slot). Or in other words, performing a left circular shift on each element of the sequence (or "frequency offset") by the time-domain position of the reference signal (or "the starting symbol of the PRS within a slot") For example, if the frequency offset is S={0,3,1,4,2,5}, when L=0, the frequency offset is unchanged; L=1, the frequency offset is replaced by S={3, 1,4,2,5,0}; L=2, the frequency offset is replaced by S={1, 4,2,5,0,3}; etc.

In some embodiments, the BS and/or UE may rotate each element of frequency offset to the right by the number of L (the starting symbol of the PRS within a slot). In other words, performing a right circular shift on each element of the sequence (or "frequency offset") by the time-domain position of the reference signal (or "the starting symbol of the PRS within a slot"). For example, if the frequency offset is S={0,3,1,4,2,5}, when L=0, the frequency offset is unchanged; L=1, the frequency offset is replaced by S={5, 0,3,1,4,2}; L=2, the frequency offset is replaced by S={2, 5,0,3,1,4}; etc.

In some embodiments, whether the rotation is applicable can be configured by signaling. In some embodiments, whether the rotation is on the left or on the right can be configured by signaling. In some embodiments, the rotation may not be applied to the cases when C=2. In some embodiments, the rotation may not be applied to the cases when N=2.

For the enhanced mapping mechanism of Case 2-2, in some embodiments, all the configurations are the same as the conventional mapping mechanism of the second DL PRS configuration in Case 1-2 (as discussed above), except for the frequency offset (assume the rotation is on the left in this case). That is, compared to the second DL PRS resource in the conventional mapping mechanism of Case 1-2, the frequency offset may be replaced by S={3,1,4,2,5,0} since the starting symbol of the PRS within a slot is L=1.

Figure 12:
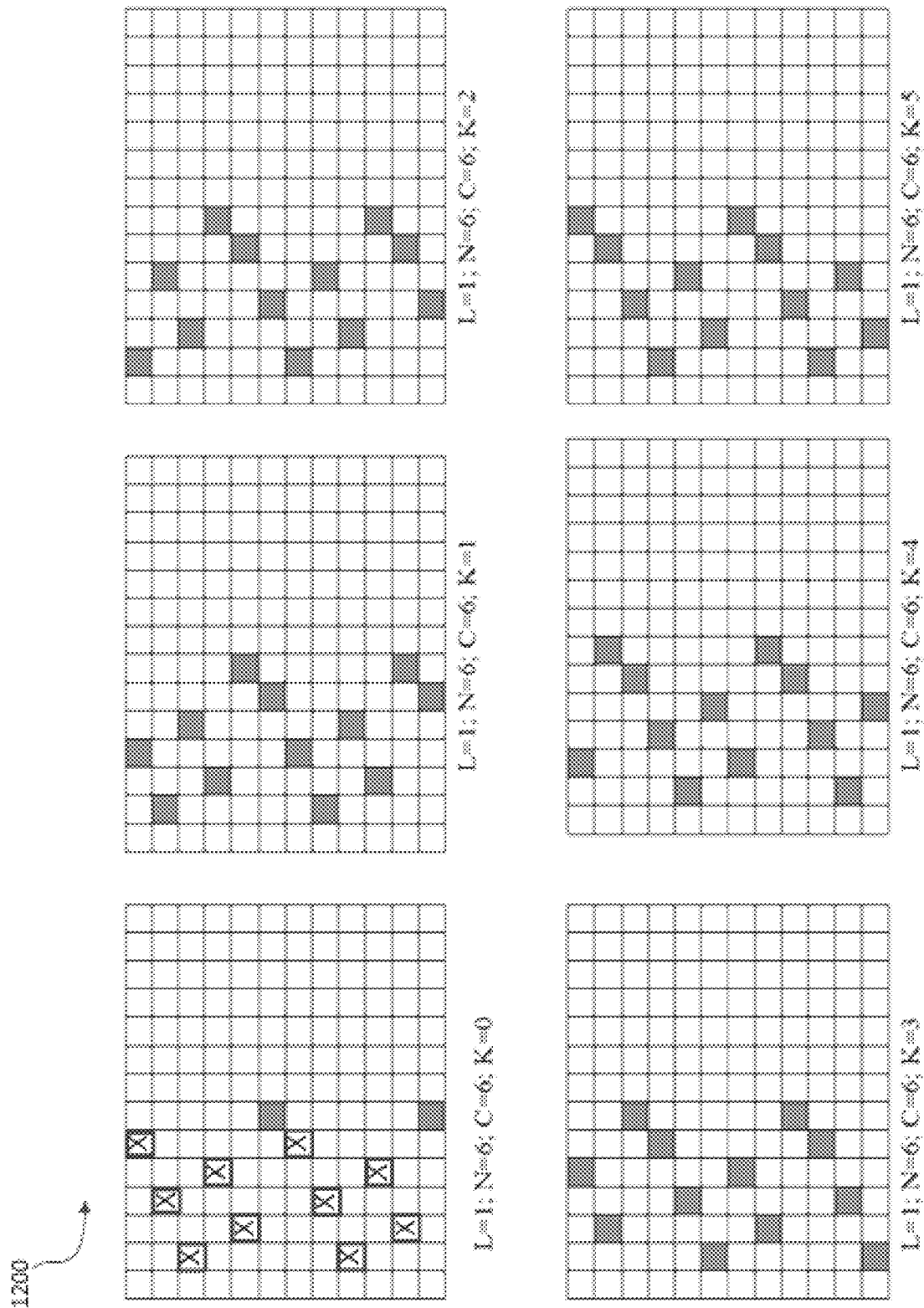
FIG. 12 illustrates example time-frequency maps for Case 2-2, in accordance with an embodiment of the present disclosure.

As a result, there are 6 different DL PRS resources depend on different values of K (i.e. K=0,1,2,3,4,5), the corresponding resource mapping patterns are as shown in FIG. 12, where only the one DL PRS resource (i.e. when K=0) has mapped resource elements that collide (e.g., interfere) with the mapped resource elements in FIG. 9. Therefore, it's easier for scheduler to avoid interference among different PRS resources.

FIG. 12 illustrates example time-frequency maps for Case 2-2, in accordance with an embodiment of the present disclosure. As shown, a resource element in each of the time-frequency maps may be unmapped (shown in FIG. 12 as a 'white box') or mapped (shown in FIG. 12 as a 'dark box'). The mapped resource elements (REs) that interfere with mapped resource elements (REs) in FIG. 9 are marked with 'X'.

For the enhanced mapping mechanism of Case 2-2, in some embodiments, all the configurations are the same as the conventional mapping mechanism of the third DL PRS configuration in Case 1-2 (as discussed above), except for the frequency offset (assume the rotation is on the left in this case). That is, compared to the third DL PRS resource in the conventional mapping mechanism of Case 1-2, the frequency offset may be replaced by S={1,4,2,5,0,3} since the starting symbol of the PRS within a slot is L=2.

Figure 13:
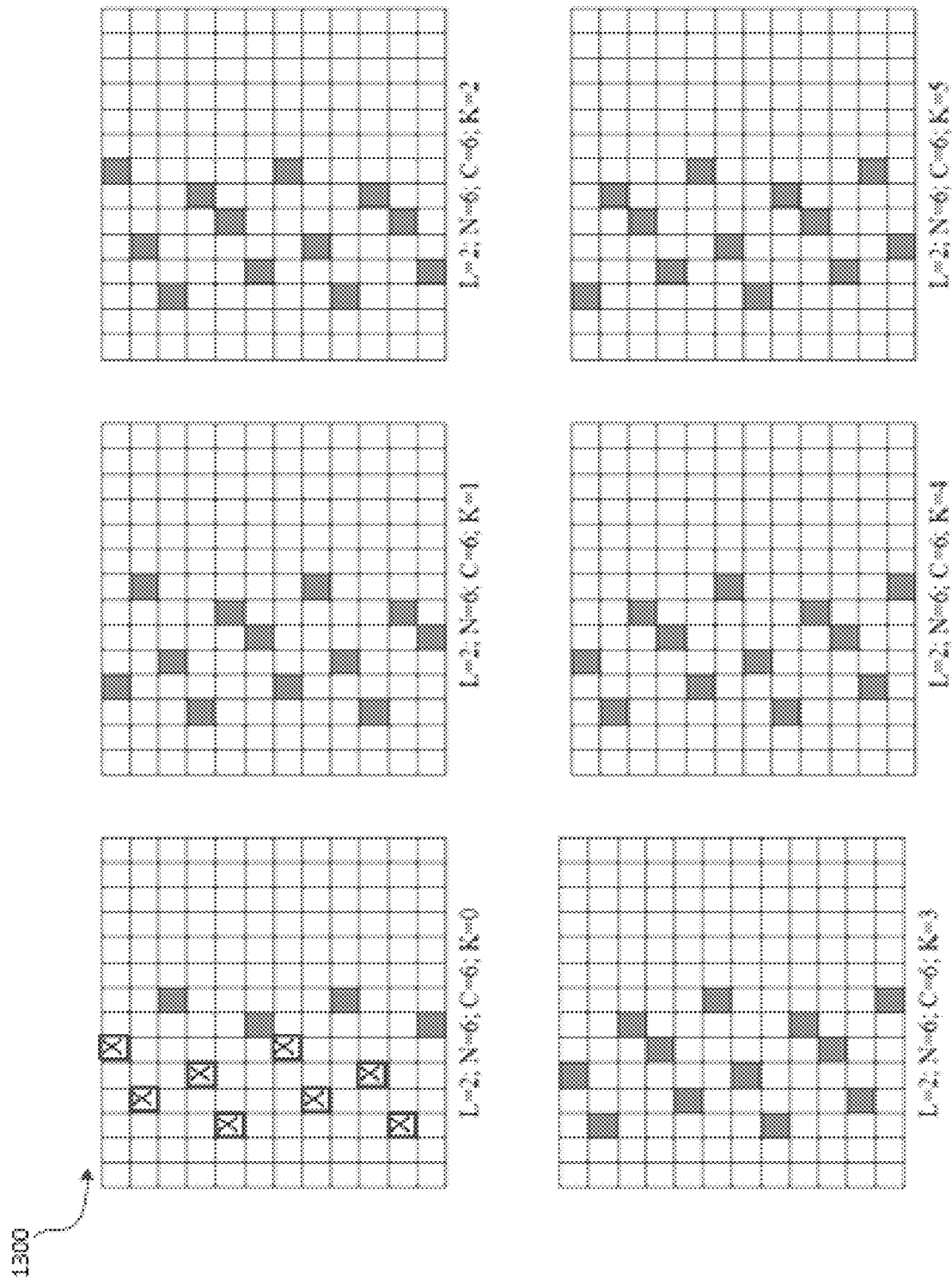
FIG. 13 illustrates example time-frequency maps for Case 2-2, in accordance with an embodiment of the present disclosure.

As a result, there are 6 different DL PRS resources depend on different values of K (i.e. K=0,1,2,3,4,5), the corresponding resource mapping patterns are as shown in FIG. 13, where only the one DL PRS resource (i.e. when K=0) has mapped resource elements that collide (e.g., interfere) with the mapped resource elements in FIG. 9. Therefore, it's easier for scheduler to avoid interference among different PRS resources.

FIG. 13 illustrates example time-frequency maps for Case 2-2, in accordance with an embodiment of the present disclosure. As shown, a resource element in each of the time-frequency maps may be unmapped (shown in FIG. 13 as a 'white box') or mapped (shown in FIG. 13 as a 'dark box'). The mapped resource elements (REs) that interfere with mapped resource elements (REs) in FIG. 9 are marked with 'X'.

4. Mapping of Downlink PRS Resources when L=0, N=12, C=12, K=0

This portion of the present disclosure discusses the mapping of downlink (DL) PRS resources when L=0, N=12, C=12, K=0.

4.1. Conventional Mapping Mechanism (Case 1-3)

Figure 14:
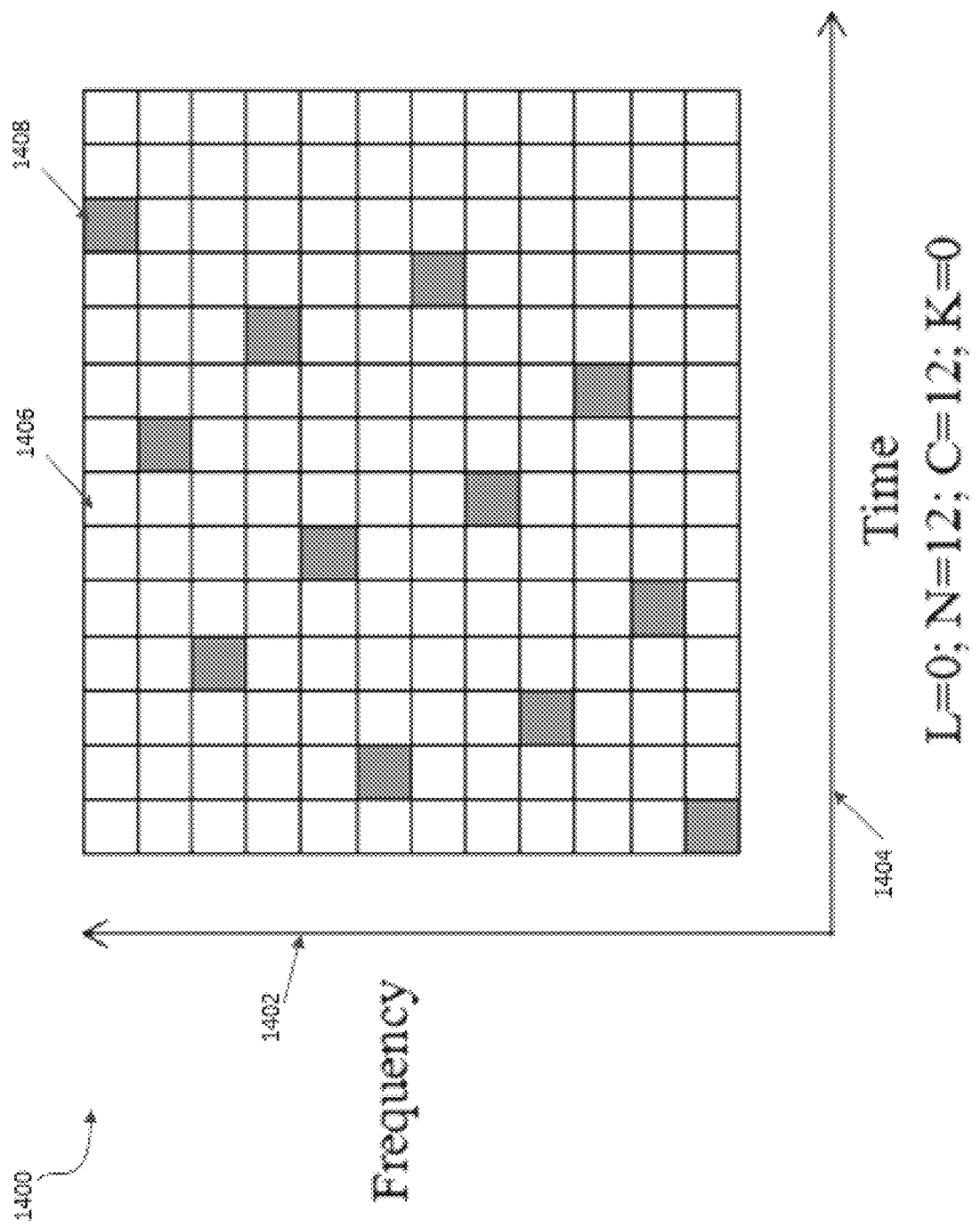
FIG. 14 illustrates an example time-frequency map for Case 1-3, in accordance with the conventional system.

First DL PRS configuration has the following parameters: L=0; N=12; C=12; K=0; resulting in a frequency offset that is S={0,6,3,9,1,7,4,10,2,8,5,11} that defines a particular DL PRS resource, and the corresponding resource mapping pattern is shown in FIG. 14. For example, FIG. 14 illustrates a resource mapping pattern based on the first UL PRS configuration, in accordance with the conventional system. The time-frequency map 1400 includes a frequency axis 1402 that corresponds to subcarriers in a resource block (RB) and a time axis 1404 that corresponds to symbols in a slot. The time-frequency map 1400 includes a plurality of resource elements that each correspond to a subcarrier and a symbol, depending on where positioned on the time-frequency map 1400. As shown in FIG. 14, a resource element may be unmapped (shown in FIG. 14 as a 'white box', such as RE 1406) or mapped (shown in FIG. 14 as a 'dark box', such as RE 1408), according to the aforementioned resource mapping pattern. The 'L' parameter that corresponds to the starting symbol of a PRS resource within a slot (e.g. L=0 means the starting symbol of a PRS resource within a slot is the first symbol); an 'N' parameter that corresponds to the number of symbols per PRS resource within a slot (e.g., N=12 means the number of symbols per PRS resource within a slot is 12); a 'C' parameter that corresponds to the resource element spacing in each symbol of the PRS resource (e.g. C=12 means resource element spacing in each symbol of the PRS resource is 12); a 'K' parameter that corresponds to the resource element (RE) offset in the frequency domain for the first symbol in a PRS resource (e.g. K=0 means the resource element (RE) offset in the frequency domain for the first symbol in a PRS resource is 1); and an 'S' parameter that corresponds to the relative RE offsets of all symbols that are defined relative to the RE Offset in the frequency domain of the first symbol in a PRS resource. (e.g., S={0,6,3,9,1,7,4,10,2,8,5,11} means the relative RE offset of starting symbol (or first symbol) of the PRS resource to K is 0; the relative RE offset of second symbol of the PRS resource to K is 6; the relative RE offset of third symbol of the PRS resource to K is 3 . . . )

If a second UL PRS configuration have following parameters, L=1; N=12; C=12; K=0,1,2,3,4,5,6,7,8,9,10,11 there are 12 different DL PRS resources depend on different values of K, the corresponding resource mapping patterns are as shown in FIG. 15, where some of DL PRS resources (i.e., when K=4,6,9) collide (e.g., interfere) with the DL PRS resource in FIG. 14 in some mapped resource elements (REs).

Figure 15:
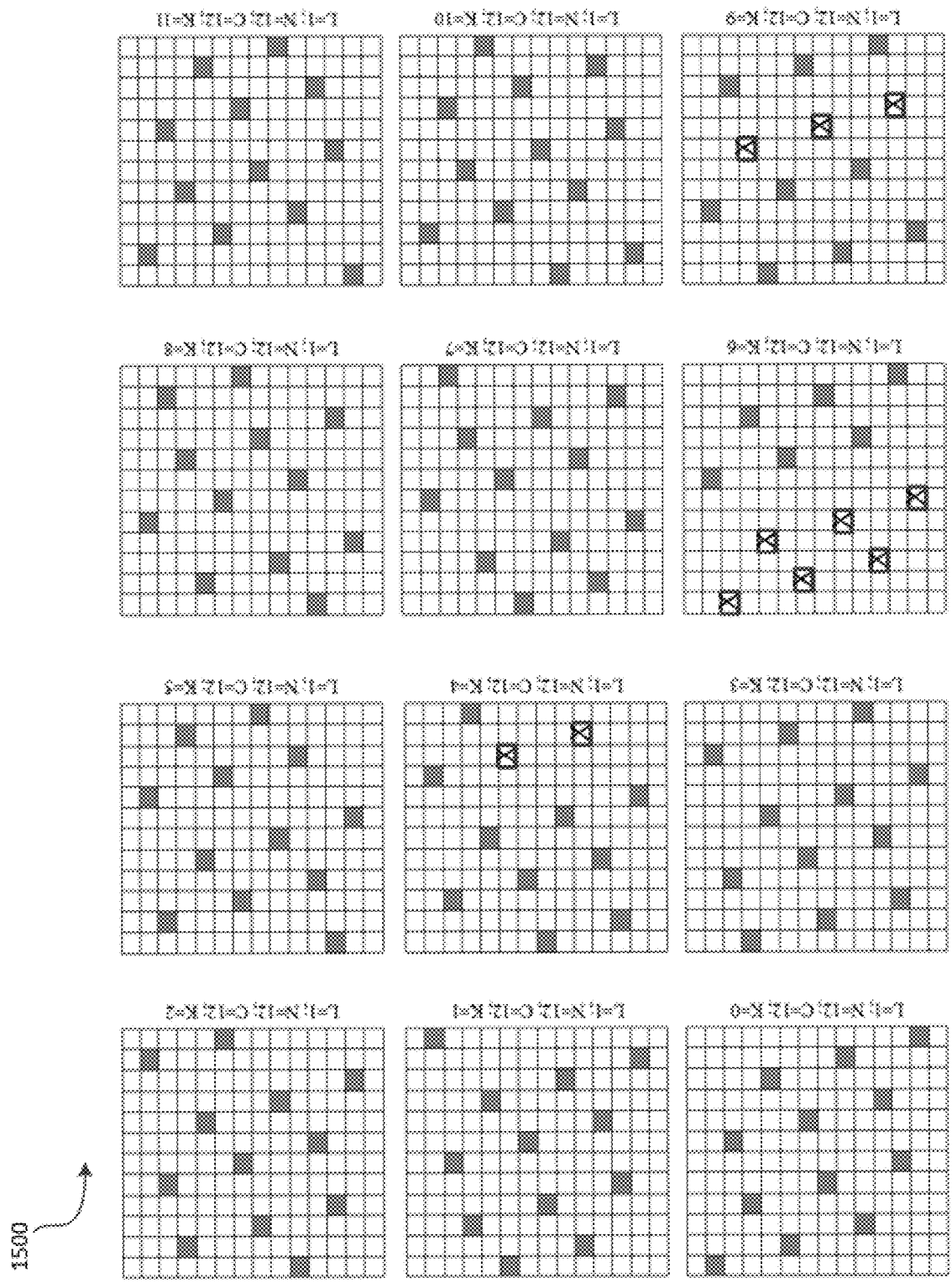
FIG. 15 illustrates example time-frequency maps for Case 1-3, in accordance with the conventional system.

FIG. 15 illustrates 12 resource mapping patterns based on the second DL PRS configuration, in accordance with the conventional system. As shown, a resource element in each of the time-frequency maps may be unmapped (shown in FIG. 15 as a 'white box') or mapped (shown in FIG. 15 as a 'dark box') according to the second DL PRS configuration. The mapped resource elements (REs) that interfere with mapped resource elements (REs) in FIG. 14 are marked with 'X'.

If a third UL PRS configuration have following parameters, L=2; N=12; C=12; K=0,1,2,3,4,5,6,7,8,9,10,11 there are 12 different DL PRS resources depend on different values of K, the corresponding resource mapping patterns are as shown in FIG. 16, where some of DL PRS resources (i.e., when K=3,10) collide (e.g., interfere) with the UL PRS resource in FIG. 14 in some mapped resource elements (REs).

Figure 16:
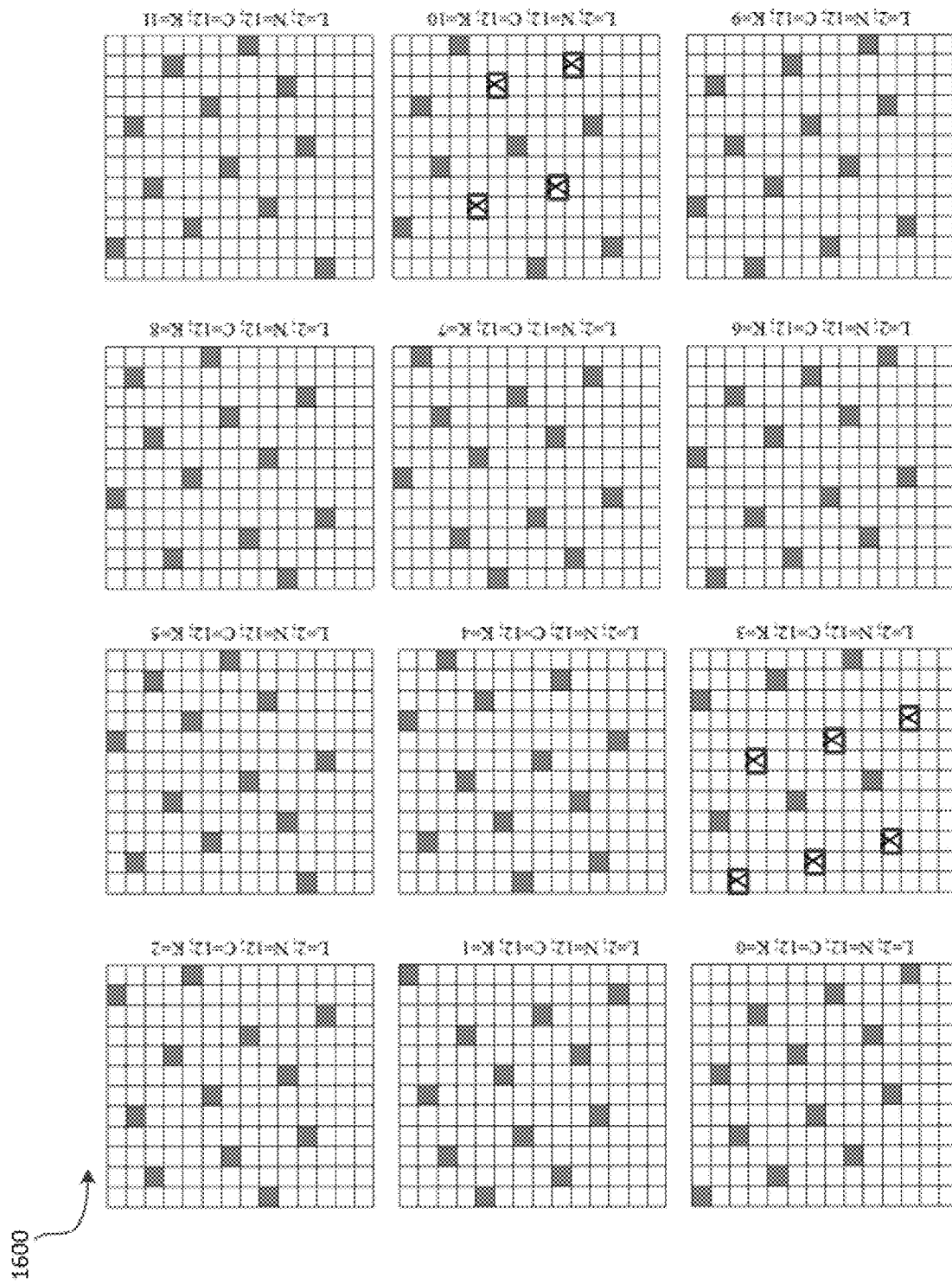
FIG. 16 illustrates example time-frequency maps for Case 1-3, in accordance with the conventional system.

FIG. 16 illustrates 12 resource mapping patterns based on the second DL PRS configuration, in accordance with the conventional system. As shown, a resource element in each of the time-frequency maps may be unmapped (shown in FIG. 16 as a 'white box') or mapped (shown in FIG. 16 as a 'dark box') according to the second DL PRS configuration. The mapped resource elements (REs) that interfere with mapped resource elements (REs) in FIG. 14 are marked with 'X'.

4.2. Enhanced Mapping Mechanism (Case 2-3)

This portion of the present disclosure is directed an enhanced mapping mechanism that eliminates and/or mitigates the technical problems associated with the conventional mapping mechanism of Case 1-3, as discussed herein.

The frequency offset (S), in some embodiments, may be determined by a number of symbols (N) and/or comb size (C) in the conventional design (sometimes referred to herein as, "conventional system"). In order to mitigate the interference, in some embodiments, the frequency offset can also depend on the starting symbol of the PRS within a slot (L).

In some embodiments, the BS and/or UE may rotate each element of frequency offset to the left by the number of L (the starting symbol of the PRS within a slot). Or in other words, performing a left circular shift on each element of the sequence (or "frequency offset") by the time-domain position of the reference signal (or "the starting symbol of the PRS within a slot"). For example, if the frequency offset is S={0,3,1,4,2,5}, when L=0, the frequency offset is unchanged; L=1, the frequency offset is replaced by S={3, 1,4,2,5,0}; L=2, the frequency offset is replaced by S={1, 4,2,5,0,3}; etc.

In some embodiments, the BS and/or UE may rotate each element of frequency offset to the right by the number of L (the starting symbol of the PRS within a slot). Or in other words, performing a right circular shift on each element of the sequence (or "frequency offset") by the time-domain position of the reference signal (or "the starting symbol of the PRS within a slot"). For example, if the frequency offset is S={0,3,1,4,2,5}, when L=0, the frequency offset is unchanged; L=1, the frequency offset is replaced by S={5, 0,3,1,4,2}; L=2, the frequency offset is replaced by S={2, 5,0,3,1,4}; etc.

In some embodiments, whether the rotation is applicable can be configured by signaling. In some embodiments, whether the rotation is on the left or on the right can be configured by signaling. In some embodiments, the rotation may not be applied to the cases when C=2. In some embodiments, the rotation may not be applied to the cases when N=2.

For the enhanced mapping mechanism of Case 2-3, in some embodiments, all the configurations are the same as the conventional mapping mechanism of the second DL PRS configuration in Case 1-3 (as discussed above), except for the frequency offset (assume the rotation is on the left in this case). That is, compared to the second DL PRS resource in the conventional mapping mechanism of Case 1-3, the frequency offset may be replaced by S={6,3,9,1,7,4,10,2,8, 5,11,0} since the starting symbol of the PRS within a slot is L=1.

Figure 17:
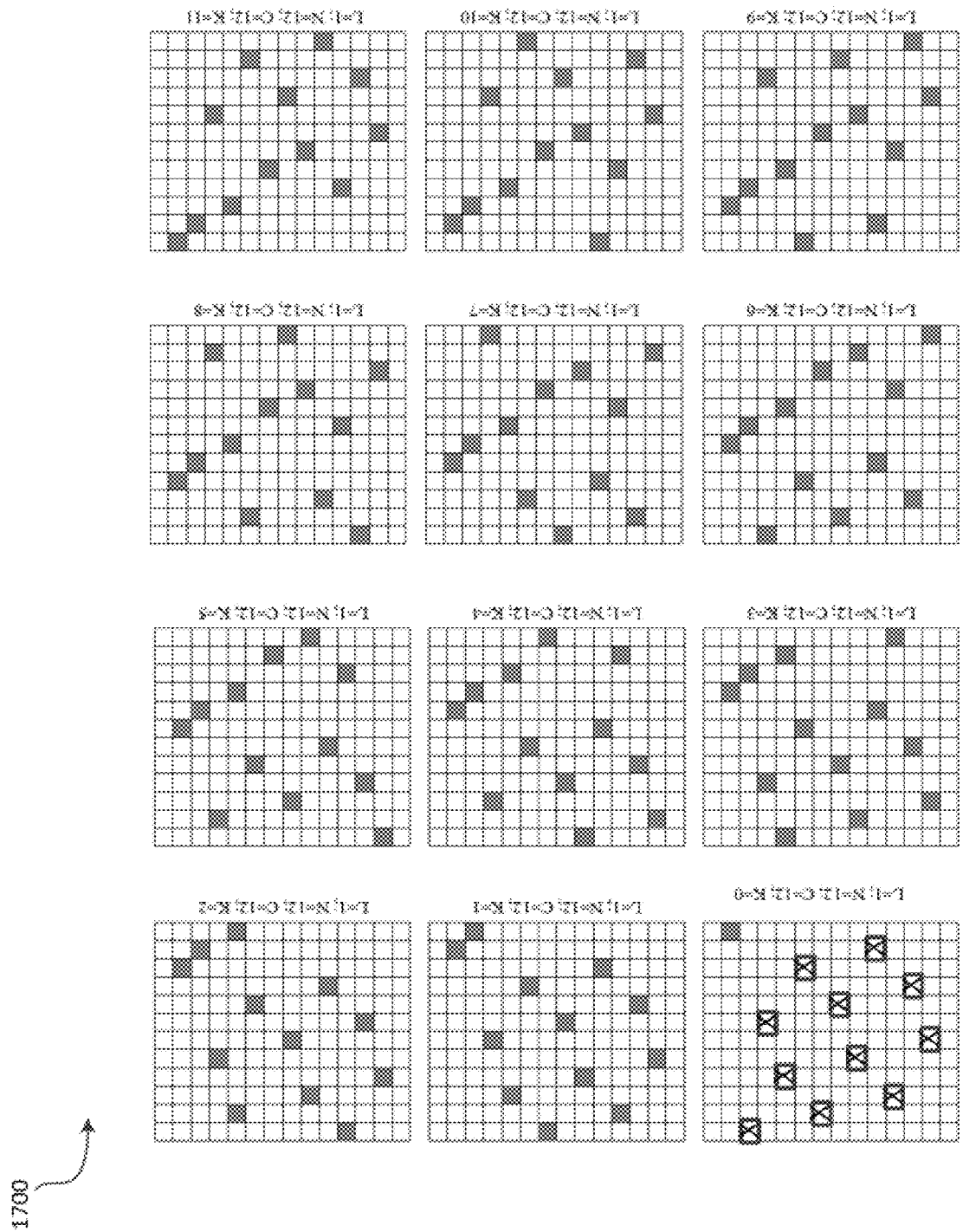
FIG. 17 illustrates example time-frequency maps for Case 2-3, in accordance with an embodiment of the present disclosure.

As a result, there are 12 different DL PRS resources depend on different values of K (i.e. K=0,1,2,3,4,5,6,7,8,9, 10), the corresponding resource mapping patterns are as shown in FIG. 17, where only the one DL PRS resource (i.e. when K=0) has mapped resource elements that collide (e.g., interfere) with the mapped resource elements in FIG. 14. Therefore, it's easier for scheduler to avoid interference among different PRS resources.

FIG. 17 illustrates example time-frequency maps for Case 2-3, in accordance with an embodiment of the present disclosure. As shown, a resource element in each of the time-frequency maps may be unmapped (shown in FIG. 17 as a 'white box') or mapped (shown in FIG. 17 as a 'dark box'). The mapped resource elements (REs) that interfere with mapped resource elements (REs) in FIG. 4 are marked with 'X'.

For the enhanced mapping mechanism of Case 2-3, in some embodiments, all the configurations are the same as the conventional mapping mechanism of the third DL PRS configuration in Case 1-3 (as discussed above), except for the frequency offset (assume the rotation is on the left in this case). That is, compared to the third DL PRS resource in the conventional mapping mechanism of Case 1-3, the frequency offset may be replaced by S={3,9,1,7,4,10,2,8,5,11,0,6} since the starting symbol of the PRS within a slot is L=2.

Figure 18:
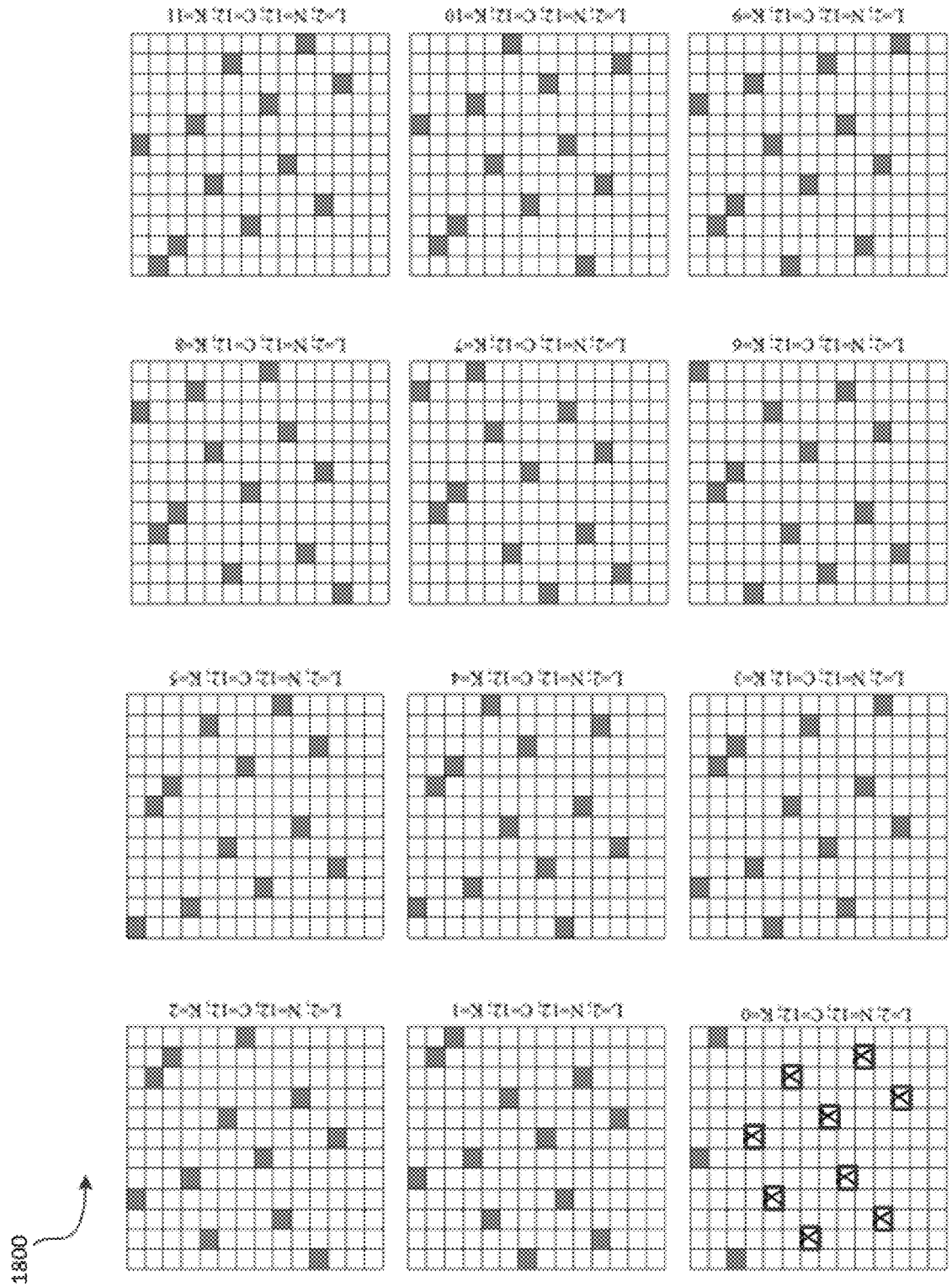
FIG. 18 illustrates example time-frequency maps for Case 2-3, in accordance with an embodiment of the present disclosure.

As a result, there are 12 different DL PRS resources depend on different values of K (i.e., K=0,1,2,3,4,5,6,7,8,9,10,11), the corresponding resource mapping patterns are as shown in FIG. 18, where only the one DL PRS resource (i.e., when K=0) has mapped resource elements that collide (e.g., interfere) with the mapped resource elements in FIG. 14. Therefore, it's easier for scheduler to avoid interference among different PRS resources.

FIG. 18 illustrates example time-frequency maps for Case 2-3, in accordance with an embodiment of the present disclosure. As shown, a resource element in each of the time-frequency maps may be unmapped (shown in FIG. 18 as a 'white box') or mapped (shown in FIG. 18 as a 'dark box'). The mapped resource elements (REs) that interfere with mapped resource elements (REs) in FIG. 14 are marked with 'X'.

5. Illustrative Methods for Mapping PRS Resources

FIG. 19 is a flow diagram depicting a method for interference management, in accordance with some embodiments of the present disclosure. Additional, fewer, or different operations may be performed in the method depending on the particular embodiment. In some embodiments, some or all operations of method 1900 may be performed by a wireless communication node, such as BS 202 in FIG. 2. In some operations, some or all operations of method 1900 may be performed by a wireless communication device, such as UE 204 in FIG. 2. Each operation may be re-ordered, added, removed, or repeated.

As shown, the method 1900 includes, in some embodiments, the operation 1902 of configuring, by a wireless communication node, a resource mapping pattern for a reference signal. The method 1900 includes the operation of 1904 of updating, by the wireless communication node based on a time-domain position of the reference signal, the resource mapping pattern by changing a sequence that represents a plurality of frequency-domain offsets of the reference signal relative to a frequency-domain position of the reference signal.

FIG. 20 is a flow diagram depicting a method for interference management, in accordance with some embodiments of the present disclosure. Additional, fewer, or different operations may be performed in the method depending on the particular embodiment. In some embodiments, some or all operations of method 2000 may be performed by a wireless communication node, such as BS 202 in FIG. 2. In some operations, some or all operations of method 2000 may be performed by a wireless communication device, such as UE 204 in FIG. 2. Each operation may be re-ordered, added, removed, or repeated.

As shown, the method 2000 includes, in some embodiments, the operation 2002 of receiving, by a wireless communication device, a resource mapping pattern for a reference signal. The method 2000 includes the operation of 2004 of updating, by the wireless communication device based on a time-domain position of the reference signal, the resource mapping pattern by changing a sequence that represents a plurality of frequency-domain offsets of the reference signal relative to a frequency-domain position of the reference signal.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A wireless communication method, comprising:
configuring, by a wireless communication node, a resource mapping pattern for a reference signal;
updating, by the wireless communication node according to a time-domain position of the reference signal, the resource mapping pattern by changing a sequence that represents a plurality of frequency-domain offsets of the reference signal relative to a frequency-domain position of the reference signal; and
sending, by the wireless communication node to a wireless communication device, a signaling to indicate whether to perform a left circular shift or a right circular shift on each element of the sequence by the time-domain position of the reference signal.

2. The wireless communication method of claim 1, wherein changing the sequence comprises performing the right circular shift on each element of the sequence by the time-domain position of the reference signal.

3. The wireless communication method of claim 1, wherein changing the sequence comprises performing the left circular shift on each element of the sequence by the time-domain position of the reference signal.

4. The wireless communication method of claim 1, further comprising sending, by the wireless communication node to the wireless communication device, a signaling to indicate whether the update is applicable.

5. The wireless communication method of claim 1, further comprising:
determining, by the wireless communication node, that a total time-domain number of time-domain symbols of the reference signal is equal to 2; and
determining, by the wireless communication node, that the step of updating the resource mapping pattern is not applicable.

6. The wireless communication method of claim 1, further comprising:
determining, by the wireless communication node, that a frequency-domain period of the reference signal is equal to 2; and
determining, by the wireless communication node, that the step of updating the resource mapping pattern is not applicable.

7. A wireless communication method, comprising:
receiving, by a wireless communication device, a resource mapping pattern for a reference signal;
updating, by the wireless communication device according to a time-domain position of the reference signal, the resource mapping pattern by changing a sequence that represents a plurality of frequency-domain offsets of the reference signal relative to a frequency-domain position of the reference signal; and
receiving, by the wireless communication device from a wireless communication node, a signaling indicating whether to perform a left circular shift or a right circular shift on each element of the sequence by the time-domain position of the reference signal.

8. The wireless communication method of claim 7, wherein changing the sequence comprises performing the right circular shift on each element of the sequence by the time-domain position of the reference signal.

9. The wireless communication method of claim 7, wherein changing the sequence comprises performing the left circular shift on each element of the sequence by the time-domain position of the reference signal.

10. The wireless communication method of claim 7, further comprising receiving, by the wireless communication device from a wireless communication node, a signaling indicating whether the update is applicable.

11. The wireless communication method of claim 7, wherein when a total time-domain number of time-domain symbols of the reference signal is equal to 2, the step of updating the resource mapping pattern is indicated to be not applicable.

12. The wireless communication method of claim 7, wherein when a frequency-domain period of the reference signal is equal to 2, the step of updating the resource mapping pattern is indicated to be not applicable.

13. A wireless communication node comprising:
at least one processor configured to:
configure a resource mapping pattern for a reference signal;
update, according to a time-domain position of the reference signal, the resource mapping pattern by changing a sequence that represents a plurality of frequency-domain offsets of the reference signal relative to a frequency-domain position of the reference signal; and
send, via a transmitter to a wireless communication device, a signaling to indicate whether to perform a left circular shift or a right circular shift on each element of the sequence by the time-domain position of the reference signal.

14. The wireless communication node of claim 13, wherein the at least one processor is configured to change the sequence by performing the right circular shift on each element of the sequence by the time-domain position of the reference signal.

15. The wireless communication node of claim 13, wherein the at least one processor is configured to change the sequence by performing the left circular shift on each element of the sequence by the time-domain position of the reference signal.

16. A wireless communication device comprising:
at least one processor configured to:
receive, via a receiver, a resource mapping pattern for a reference signal;
update, according to a time-domain position of the reference signal, the resource mapping pattern by changing a sequence that represents a plurality of frequency-domain offsets of the reference signal relative to a frequency-domain position of the reference signal; and
receive, via a receiver from a wireless communication node, a signaling indicating whether to perform a left circular shift or a right circular shift on each element of the sequence by the time-domain position of the reference signal.

17. The wireless communication device of claim 16, wherein the at least one processor is configured to change the sequence by performing the right circular shift on each element of the sequence by the time-domain position of the reference signal.

18. The wireless communication device of claim 16, wherein the at least one processor is configured to change the sequence by performing the left circular shift on each element of the sequence by the time-domain position of the reference signal.

* * * * *